United States Patent (10) Patent No.: US 12,050,383 B2
Kimura et al. (45) Date of Patent: Jul. 30, 2024

(54) POLARIZATION CONVERSION ELEMENT

(71) Applicant: Japan Display Inc., Tokyo (JP)

(72) Inventors: Shunichi Kimura, Tokyo (JP); Toshiharu Matsushima, Tokyo (JP)

(73) Assignee: JAPAN DISPLAY INC., Tokyo (JP)

(*) Notice: Subject to any disclaimer, the term of this patent is extended or adjusted under 35 U.S.C. 154(b) by 0 days.

(21) Appl. No.: 18/448,968

(22) Filed: Aug. 14, 2023

(65) Prior Publication Data

US 2023/0408873 A1 Dec. 21, 2023

Related U.S. Application Data

(63) Continuation of application No. PCT/JP2022/000572, filed on Jan. 11, 2022.

(30) Foreign Application Priority Data

Feb. 19, 2021 (JP) .................................. 2021-025384

(51) Int. Cl.
*G02F 1/1343* (2006.01)
*G02F 1/01* (2006.01)
*G02F 1/1333* (2006.01)
*G02F 1/137* (2006.01)

(52) U.S. Cl.
CPC ...... *G02F 1/134309* (2013.01); *G02F 1/0136* (2013.01); *G02F 1/133345* (2013.01); *G02F 1/13439* (2013.01); *G02F 1/137* (2013.01); *G02F 2202/22* (2013.01)

(58) Field of Classification Search
CPC ............ G02F 1/134309; G02F 1/0136; G02F 1/133345; G02F 1/13439; G02F 1/137; G02F 2202/22; G02F 1/134372; G02B 27/01; G02B 27/0101; G02B 27/017; G02B 2027/0118; G02B 2027/012; G02B 2027/0121; G02B 2027/015; G02B 27/283; G02B 2027/0112; B60R 2300/205; G03B 21/604
See application file for complete search history.

(56) References Cited

U.S. PATENT DOCUMENTS

| | | | |
|---|---|---|---|
| 2006/0250338 A1* | 11/2006 | Karman ............... | G02F 1/13439 345/87 |
| 2009/0109391 A1* | 4/2009 | Ito ...................... | G02F 1/134363 349/141 |
| 2015/0116612 A1* | 4/2015 | Song ................... | G02B 30/28 349/37 |

FOREIGN PATENT DOCUMENTS

JP 2018-030522 A 3/2018

* cited by examiner

*Primary Examiner* — Mariam Qureshi
(74) *Attorney, Agent, or Firm* — XSENSUS LLP

(57) ABSTRACT

According to one embodiment, a polarization conversion element includes a first wiring and a second wiring, a planar electrode, a control electrode including first strip electrodes, and a first alignment film, a second substrate including a second alignment film, and a liquid crystal layer. An alignment treatment direction of the first alignment film and an alignment treatment direction of the second alignment film are parallel to each other and cross an extension direction of the first strip electrodes. The control electrode overlaps the planar electrode in plan view. An applied voltage of the first wiring is configured to be higher than an applied voltage of the second wiring. The planar electrode is configured to have a voltage gradient.

10 Claims, 23 Drawing Sheets

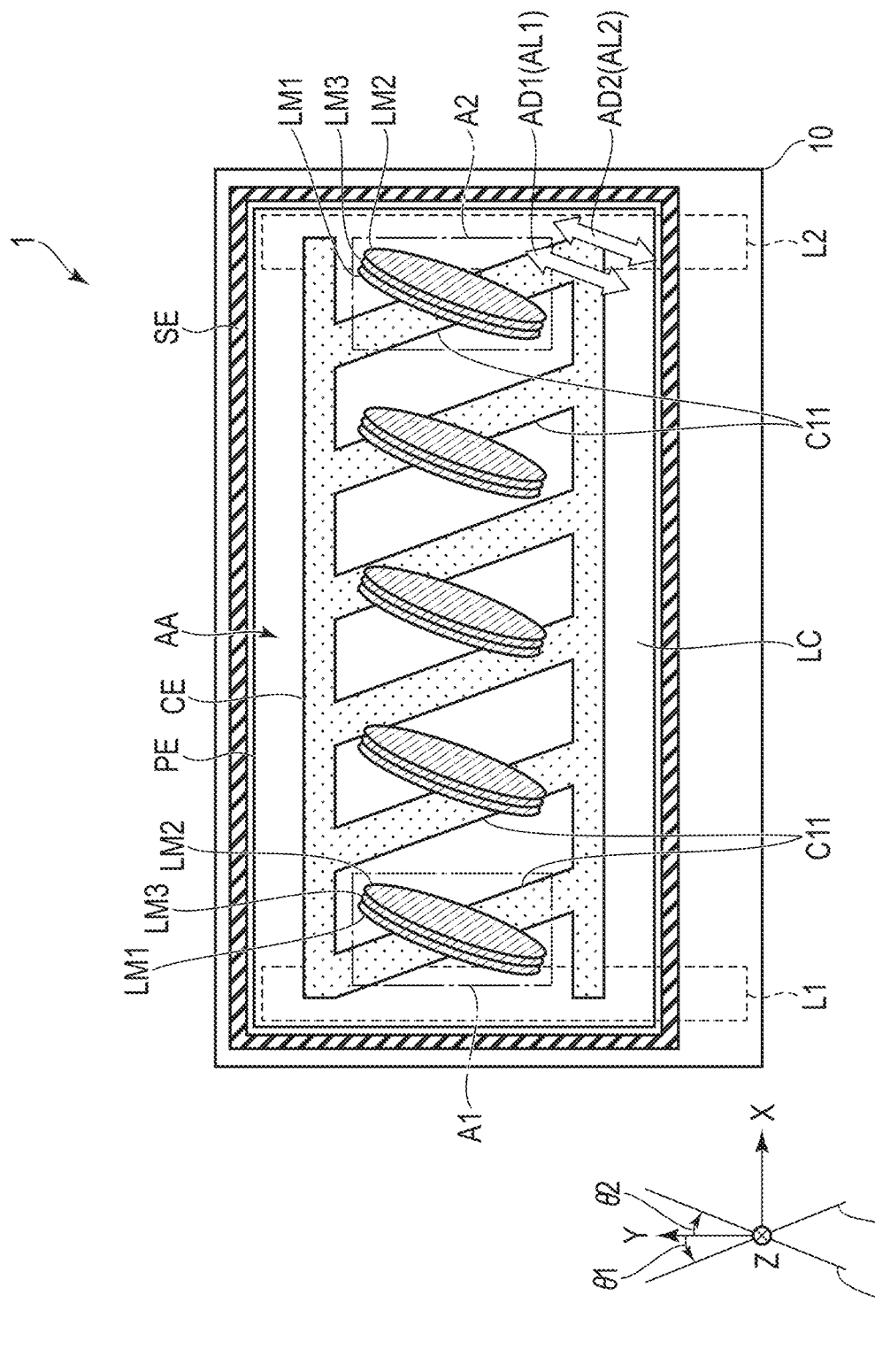
F I G. 5

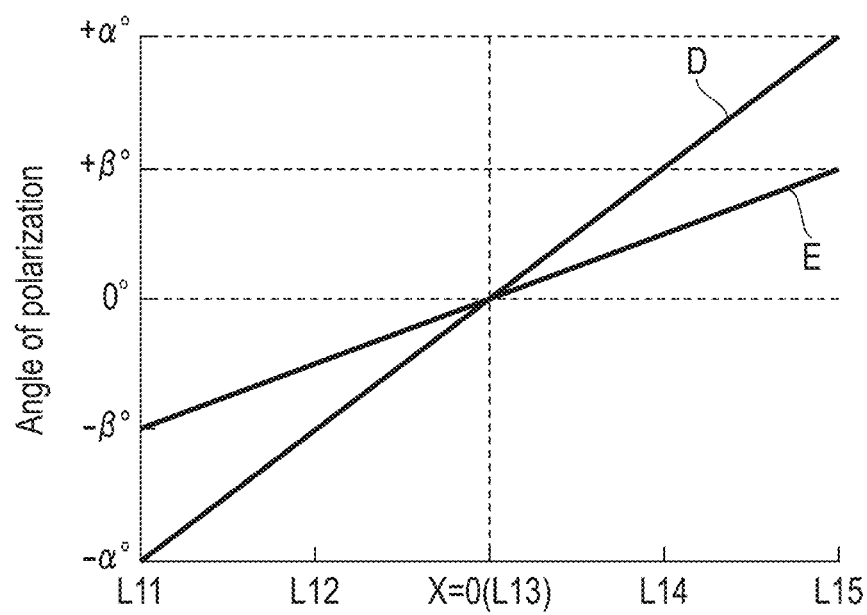
F I G. 19

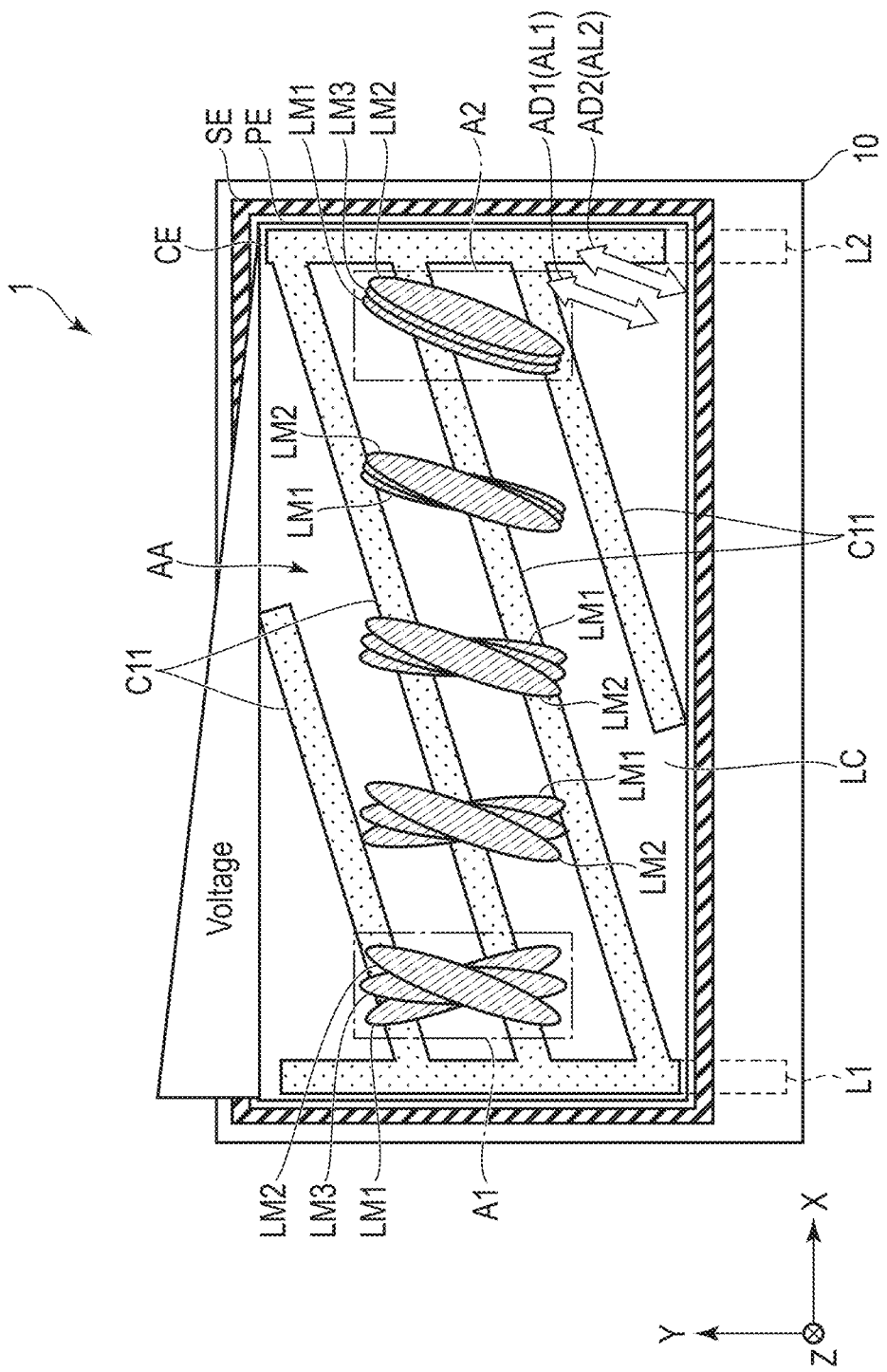
F I G. 21

POLARIZATION CONVERSION ELEMENT

CROSS-REFERENCE TO RELATED APPLICATIONS

This application is a Continuation Application of PCT Application No. PCT/JP2022/000572, filed Jan. 11, 2022 and based upon and claiming the benefit of priority from Japanese Patent Application No. 2021-025384, filed Feb. 19, 2021, the entire contents of all of which are incorporated herein by reference.

FIELD

Embodiments described herein relate generally to a polarization conversion element.

BACKGROUND

In recent years, various head-up display devices have been proposed. For example, a display device comprising a display and a combiner having a reflective surface which reflects display light emitted from the display has been proposed. In such a display device, it is required that the polarization axis of display light be rotated in a plane according to, for example, the shape of the reflective surface.

BRIEF DESCRIPTION OF THE DRAWINGS

FIG. 5 shows the alignment state of liquid crystal molecules LM in an off state where no potential difference arises between the planar electrode PE and a control electrode CE.

FIG. 19 is a diagram showing the relationship between the position in the first direction X of the polarization conversion element 1 and the angle of polarization of light LO.

FIG. 21 shows the alignment state of the liquid crystal molecules LM in the on state.

DETAILED DESCRIPTION

Figure 1:
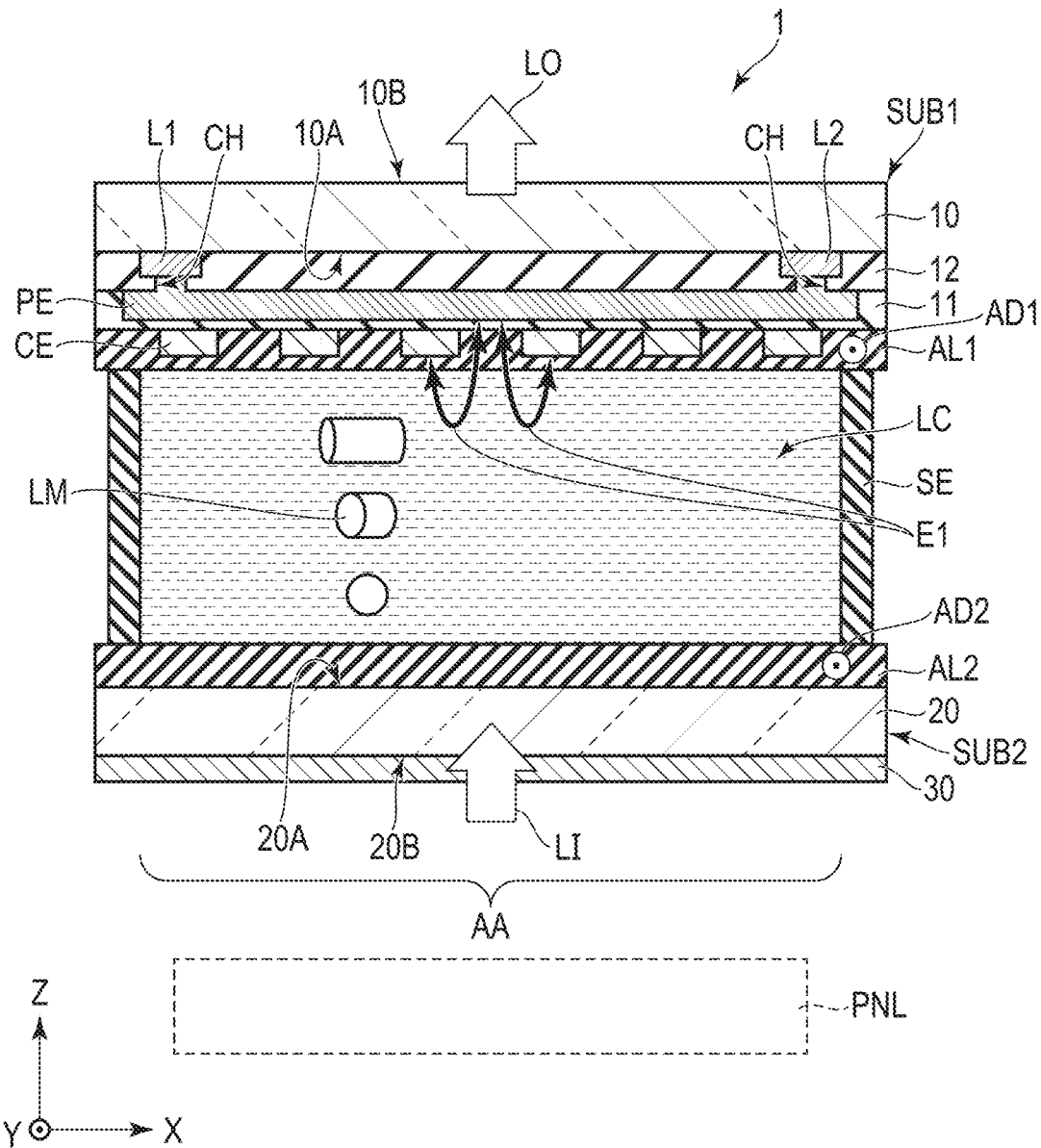
FIG. 1 is a cross-sectional view showing a configuration example of a polarization conversion element 1.

The embodiments described herein aim to provide a polarization conversion element which transmits light having a polarization axis in a desired direction in a plane.

In general, according to one embodiment, a polarization conversion element includes: a first substrate including a first transparent substrate including a first inner surface and a first outer surface, a first wiring and a second wiring disposed on the first inner surface, a transparent planar electrode being in contact with the first wiring and the second wiring, a first insulating film covering the planar electrode, a control electrode disposed on the first insulating film and including first strip electrodes extending in a same direction, and a first alignment film covering the control electrode; a second substrate including a second transparent substrate including a second inner surface and a second outer surface, and a second alignment film disposed on the second inner surface; and a liquid crystal layer disposed between the first substrate and the second substrate. An alignment treatment direction of the first alignment film and an alignment treatment direction of the second alignment film are parallel to each other and cross an extension direction of the first strip electrodes. The control electrode overlaps the planar electrode in plan view. An applied voltage of the first wiring is configured to be higher than an applied voltage of the second wiring. The planar electrode is configured to have a voltage gradient.

According to an embodiment, a polarization conversion element which transmits light having a polarization axis in a desired direction in a plane can be provided.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

FIG. 1 is a cross-sectional view showing a configuration example of a polarization conversion element 1. In the cross-sectional view of the polarization conversion element 1 shown in the figure, a first direction X, a second direction Y, and a third direction Z are orthogonal to each other but may cross at an angle other than 90°. The first direction X and the second direction Y correspond to, for example, directions parallel to a substrate included in the polarization conversion element 1, and the third direction Z corresponds to the thickness direction of the polarization conversion element 1.

The polarization conversion element 1 is, for example, a liquid crystal element and comprises a first substrate SUB1, a second substrate SUB2, and a liquid crystal layer LC. The liquid crystal layer LC is held between the first substrate SUB1 and the second substrate SUB2 and is sealed by a sealant SE. The polarization conversion element 1 described here, for example, drives the liquid crystal layer LC by an electric field μl along a main surface of a substrate and controls the alignment state of liquid crystal molecules LM included in the liquid crystal layer LC. The main surface of the substrate here corresponds to an X-Y plane defined by the first direction X and the second direction Y.

The first substrate SUB1 is located on the front surface side of the second substrate SUB2. The first substrate SUB1 comprises a first transparent substrate 10, wirings including a first wiring L1 and a second wiring L2, a first insulating film 11, a second insulating film 12, a planar electrode PE, a control electrode CE, and a first alignment film AL1.

The first transparent substrate 10 comprises a first inner surface 10A and a first outer surface 10B substantially parallel to the X-Y plane. The wirings including the first wiring L1 and the second wiring L2 are disposed on the first inner surface 10A. In the example shown in FIG. 1, the second insulating film 12 is disposed on the first inner surface 10A and comprises contact holes CH penetrating to the wirings, respectively. Note that the second insulating film 12 may be omitted.

The planar electrode PE is formed on the surface of the second insulating film 12 and contacts the second insulating film 12. In addition, the planar electrode PE contacts wirings such as the first wiring L1 and the second wiring L2 in the contact holes CH. If the second insulating film 12 is omitted, the planar electrode PE is disposed on the first inner surface 10A and contacts the wirings. As will be described later, the first wiring L1 is configured such that a voltage different from a voltage applied to the second wiring L2 is applied to the first wiring L1, thereby allowing a voltage gradient to be formed in the planar electrode PE.

The first insulating film 11 covers the planar electrode PE. The control electrode CE is disposed on the surface of the first insulating film 11 and contacts the first insulating film 11. The first alignment film AL1 covers the control electrode CE.

The second substrate SUB2 comprises a second transparent substrate 20 and a second alignment film AL2. The second transparent substrate 20 comprises a second inner surface 20A and a second outer surface 20B substantially parallel to the X-Y plane. The second alignment film AL2 is disposed on the second inner surface 20A. The first alignment film AL1 and the second alignment film AL2 contact the liquid crystal layer LC.

On the second outer surface 20B of the second transparent substrate 20, an antistatic layer 30 is disposed. The antistatic layer 30 is a transparent conductive film.

The first transparent substrate 10 and the second transparent substrate 20 are insulating substrates, for example, glass substrates or resin substrates. In addition, the first transparent substrate 10 and the second transparent substrate 20 may have flexibility. The first insulating film 11 and the second insulating film 12 are transparent inorganic insulating films of, for example, silicon oxide.

The control electrode CE and the antistatic layer 30 are transparent electrodes formed of transparent conductive materials such as indium tin oxide (ITO) or indium zinc oxide (IZO). The wirings including the first wiring L1 and the second wiring L2 may be formed of a transparent conductive material such as ITO or may be formed of a metallic material such as aluminum (Al), titanium (Ti), molybdenum (Mo), or tungsten (W). The number of wirings that contact the planar electrode PE is not limited to two, but may be three or more. In addition, if the wirings are formed of a metallic material, the widths of the wirings should preferably be small in order to suppress undesirable reflection or in order to suppress a decrease in transmittance.

The planar electrode PE is a transparent electrode formed of a material different from that of the control electrode CE (or a material having higher resistance than that of the control electrode CE). Moreover, the planar electrode PE is formed to have sheet resistance greater than or equal to 100 times the wiring resistance of the wirings including the first wiring L1 and the second wiring L2.

For example, the planar electrode PE is a high-resistance conductive film formed of an indium-based oxide such as IGZO or a metallic oxide such as ZnO. To increase the resistance of the planar electrode PE formed of these materials, it is preferable that the planar electrode PE be in contact with an insulating film having the ability to supply oxygen, such as silicon oxide. For this reason, in the example shown in FIG. 1, it is preferable that the first insulating film 11 and the second insulating film 12, which are in contact with the planar electrode PE, be formed of silicon oxide.

The liquid crystal layer LC is composed of, for example, a negative liquid crystal material having negative dielectric anisotropy, but may be composed of a positive liquid crystal material having positive dielectric anisotropy as will be described later.

The first alignment film AL1 and the second alignment film AL2 are horizontal alignment films having alignment restriction force substantially parallel to the X-Y plane. An alignment treatment direction AD1 of the first alignment film AL1 and an alignment treatment direction AD2 of the second alignment film AL2 are substantially parallel to each other. The alignment treatment here may be rubbing treatment or photo-alignment treatment. The liquid crystal molecules LM are initially aligned in the alignment treatment directions AD1 and AD2 in an off state where no potential difference arises between the control electrode CE and the planar electrode PE.

In the polarization conversion element 1 as described above, the antistatic layer 30 comprises an input plane of linearly polarized light LI and the first outer surface 10B corresponds to an output plane of linearly polarized light (or elliptically polarized light) LO. The alignment treatment directions AD1 and AD2 or the initial alignment direction of the liquid crystal molecules LM in the X-Y plane is parallel to the polarization axis of linearly polarized light LI.

In an active area AA where linearly polarized light LI is transmitted, the control electrode CE overlaps the planar electrode PE with the first insulating film 11 therebetween.

The planar electrode PE is a single electrode disposed over substantially all the area of the active area AA and is a sheet electrode having no slit or the like. The control electrode CE is a single electrode disposed over substantially all the area of the active area AA and is a comb electrode having strip electrodes (or slits). Details of the control electrode CE will be described later.

The control electrode CE and the planar electrode PE are controlled to apply a predetermined drive voltage to the liquid crystal layer LC near the first substrate SUB1. In an on state where a potential difference arises between the control electrode CE and the planar electrode PE, the electric field µl is formed between the control electrode CE and the planar electrode PE. The electric field µl acts on the liquid crystal layer LC, and the liquid crystal molecules LM near the first substrate SUB1 are aligned in a direction different from the initial alignment direction. On the other hand, the liquid crystal molecules LM near the second substrate SUB2 are maintained in the initial alignment state.

Thus, in part of the area of the liquid crystal layer LC, the liquid crystal molecules LM arranged in the third direction Z are aligned twistedly as shown in FIG. 1. Of the liquid crystal layer LC, the area including the twistedly aligned liquid crystal molecules LM has optical rotatory power to rotate the polarization axis of linearly polarized light.

In a display device comprising the above-described polarization conversion element 1, a display panel PNL indicated by a broken line is disposed, for example, on the back surface side of the polarization conversion element 1. That is, the display panel PNL and the polarization conversion element 1 are opposed in the third direction Z. The second substrate SUB2 is located between the display panel PNL and the first substrate SUB1. The display panel PNL comprises, for example, a polarizer and emits linearly polarized light LI toward the second substrate SUB2. The polarization conversion element 1 emits linearly polarized light (or elliptically polarized light) LI obtained by rotating the polarization axis of linearly polarized light LO, which is incident light, to a desired angle.

First Embodiment

Figure 2:
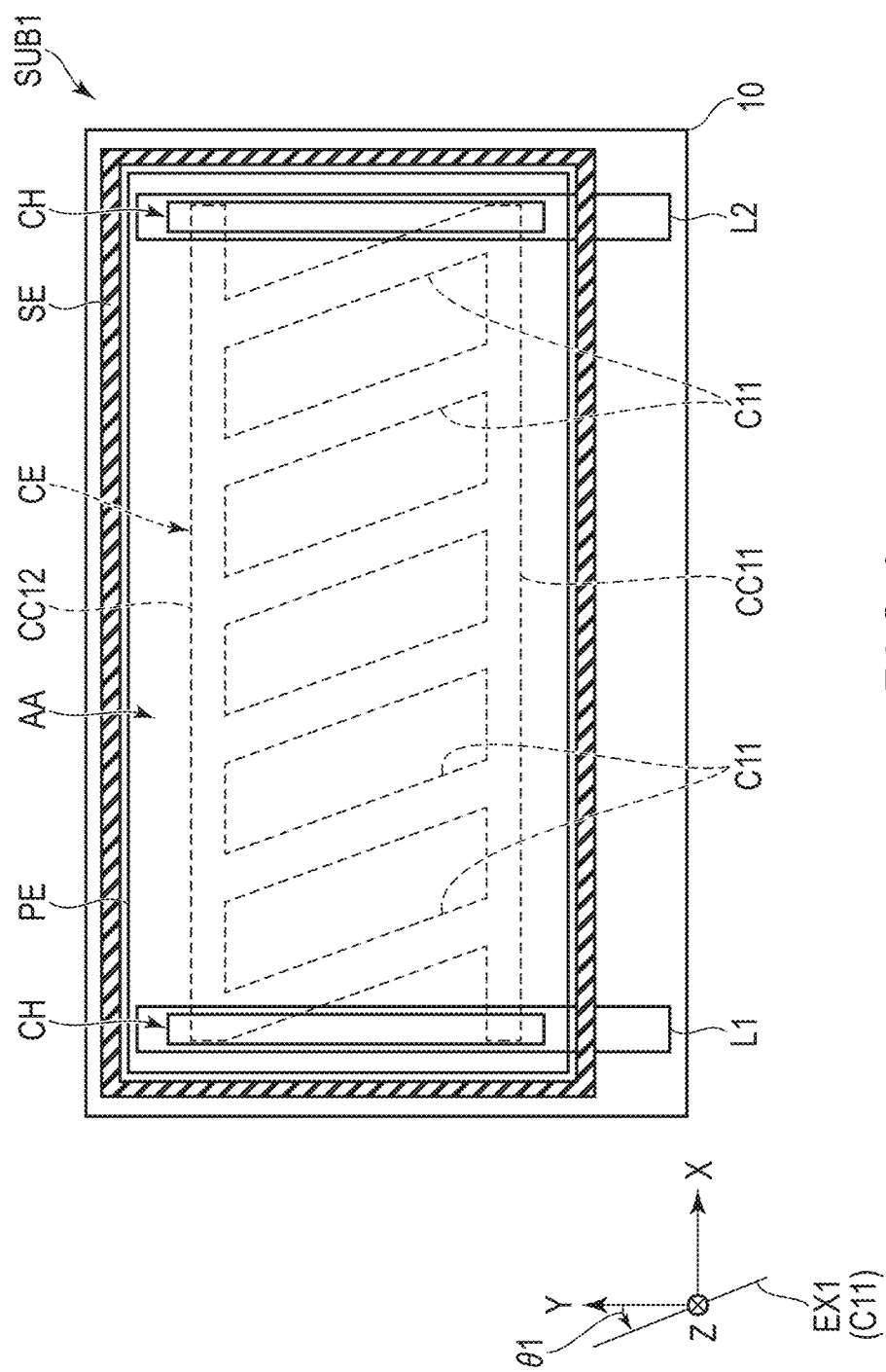
FIG. 2 is a plan view showing a configuration example of a first substrate SUB1 shown in FIG. 1.

FIG. 2 is a plan view showing a configuration example of the first substrate SUB1 shown in FIG. 1. The planar electrode PE is disposed in the inner active area AA, which is surrounded by the sealant SE.

The first wiring L1 and the second wiring L2 each extend in the second direction Y and are arranged in the first direction X. The first wiring L1 is located on one end side (left side of the figure) in the first direction X of the active area AA, and is in contact with the planar electrode PE in the contact hole CH. The second wiring L2 is located on the other end side (right side of the figure) in the first direction X of the active area AA, and is in contact with the planar electrode PE in the contact hole CH. The first wiring L1 and the second wiring L2 are each drawn out of the sealant SE, and are each configured to have a predetermined voltage applied thereto.

Here, the first wiring L1 and the second wiring L2 are shown in the figure as the wirings connected to the planar electrode PE, but another wiring may be disposed between the first wiring L1 and the second wiring L2. That is, the number of wirings that are connected to the planar electrode PE may be three or more.

The control electrode CE indicated by a broken line overlaps the planar electrode PE. The control electrode CE comprises first strip electrodes C11 and strip common electrodes CC11 and CC12. The common electrodes CC11 and CC12 each extend in the first direction X and are arranged with a distance therebetween in the second direction Y. The first strip electrodes C11 are located between the common electrode CC11 and the common electrode CC12, and are arranged with a distance therebetween in the first direction X. One end side of each of the first strip electrodes C11 is connected to the common electrode CC11. The other end side of each of the first strip electrodes C11 is connected to the common electrode CC12.

The first strip electrodes C11 extend in the same direction. When the second direction Y is defined as a reference direction, an extension direction EX1 of the first strip electrodes C11 crosses the second direction Y at a counter-clockwise acute angle θ1. Each of the first strip electrodes C11 crosses the common electrodes CC11 and CC12 at an angle other than 90°. For example, the angle θ1 is smaller than 45°, should preferably be smaller than or equal to 10° in order to maintain linearly polarized light, and is set to the maximum value of an angle at which a polarization axis is rotated in the X-Y plane.

Figure 3:
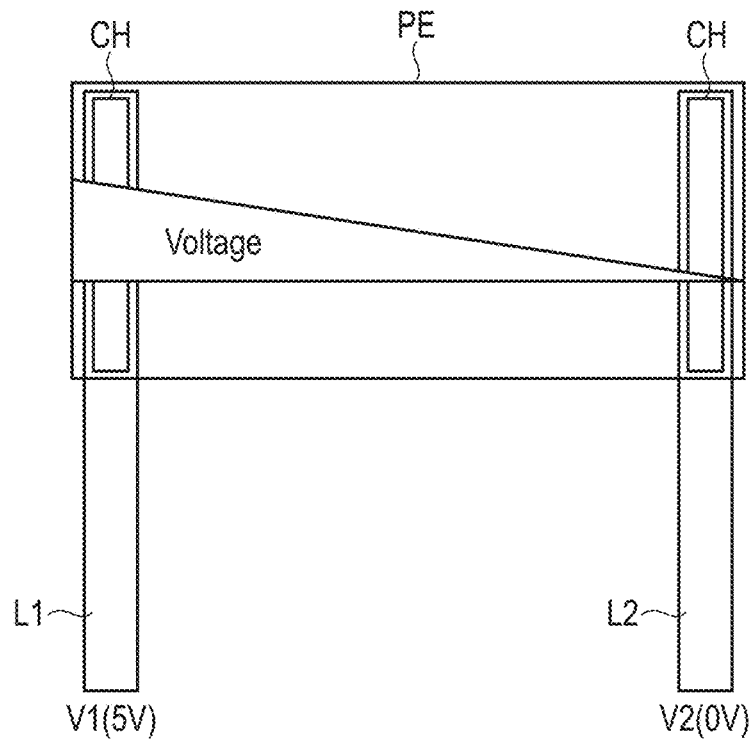
FIG. 3 is a diagram for explaining an example of a voltage gradient of a planar electrode PE.

FIG. 3 is a diagram for explaining an example of a voltage gradient of the planar electrode PE.

In the example shown in FIG. 3, the applied voltage V1 of the first wiring L1 is set higher than the applied voltage V2 of the second wiring L2 (V1>V2). In this case, in the in-plane voltage distribution of the planar electrode PE, the planar electrode PE has a voltage gradient such that the voltage decreases gradually from the position contacting the first wiring L1 to the position contacting the second wiring L2.

For example, the applied voltage V1 is 5 V and the applied voltage V2 is 0 V. In the planar electrode PE, the voltage near the position contacting the first wiring L1 is 5 V and the voltage near the position contacting the second wiring L2 is 0 V, forming a voltage gradient from 5 V to 0 V between the first wiring L1 and the second wiring L2.

Figure 4:
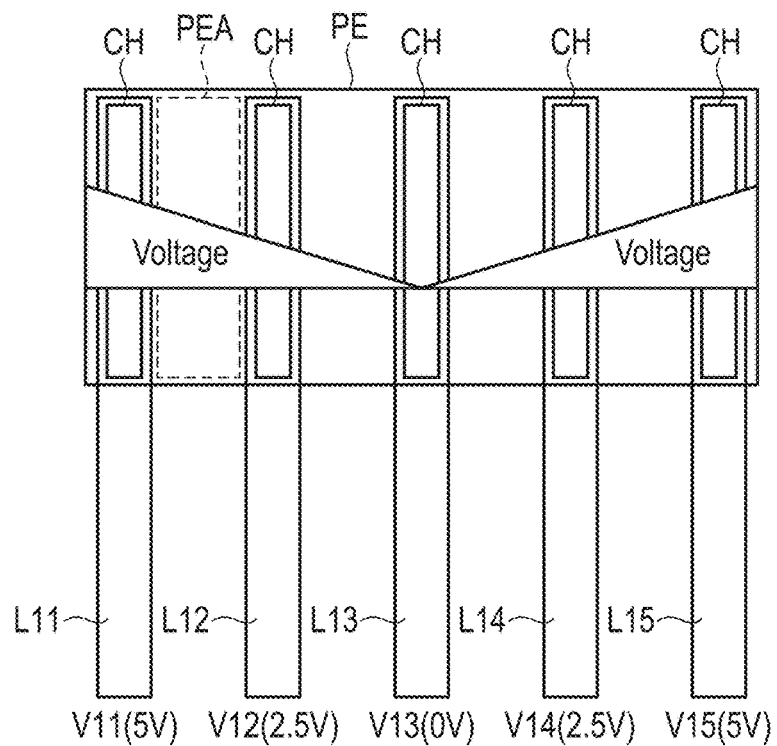
FIG. 4 is a diagram for explaining another example of the voltage gradient of the planar electrode PE.

FIG. 4 is a diagram for explaining another example of the voltage gradient of the planar electrode PE.

The example shown in FIG. 4 is different from the example shown in FIG. 3 in that the number of wirings that contact the planar electrode PE is greater. In the example shown in FIG. 4, five wirings L11 to L15 contact the planar electrode PE. Of the planar electrode PE, the area between adjacent wirings, for example, an area PEA between the wiring L11 and the wiring L12 is formed into a rectangular shape.

In this example, it is possible to form a voltage gradient such that the voltage decreases gradually from the position contacting the wiring L11 to the position contacting the wiring L13 and a voltage gradient such that the voltage increases gradually from the position contacting the wiring L13 to the position contacting the wiring L15.

For example, the wirings L11 to L15 are arranged at regular intervals, the applied voltage V11 of the wiring L11 is 5 V, the applied voltage V12 of the wiring L12 is 2.5 V, the applied voltage V13 of the wiring L13 is 0 V, the applied voltage V14 of the wiring L14 is 2.5 V, and the applied voltage V15 of the wiring L15 is 5 V.

In the planar electrode PE, the voltage near the position contacting the wiring L11 is 5 V, the voltage near the position contacting the wiring L12 is 2.5 V, and the voltage near the position contacting the wiring L13 is 0 V, forming a voltage gradient form 5 V to 0 V between the wiring L11 and the wiring L13. In addition, in the planar electrode PE, the voltage near the position contacting the wiring L14 is 2.5 V and the voltage near the position contacting the wiring L15 is V, forming a voltage gradient from 0 V to 5 V between the wiring L13 and the wiring L15.

As in the example shown in FIG. 4, as the number of wirings that contact the planar electrode PE becomes greater, the voltage gradient of the planar electrode PE can be controlled in more detail. Note that the respective applied voltages of the wirings L11 to L15 are not limited to the example shown in the figure and various voltage gradients can be formed in the planar electrode PE.

Figure 6:
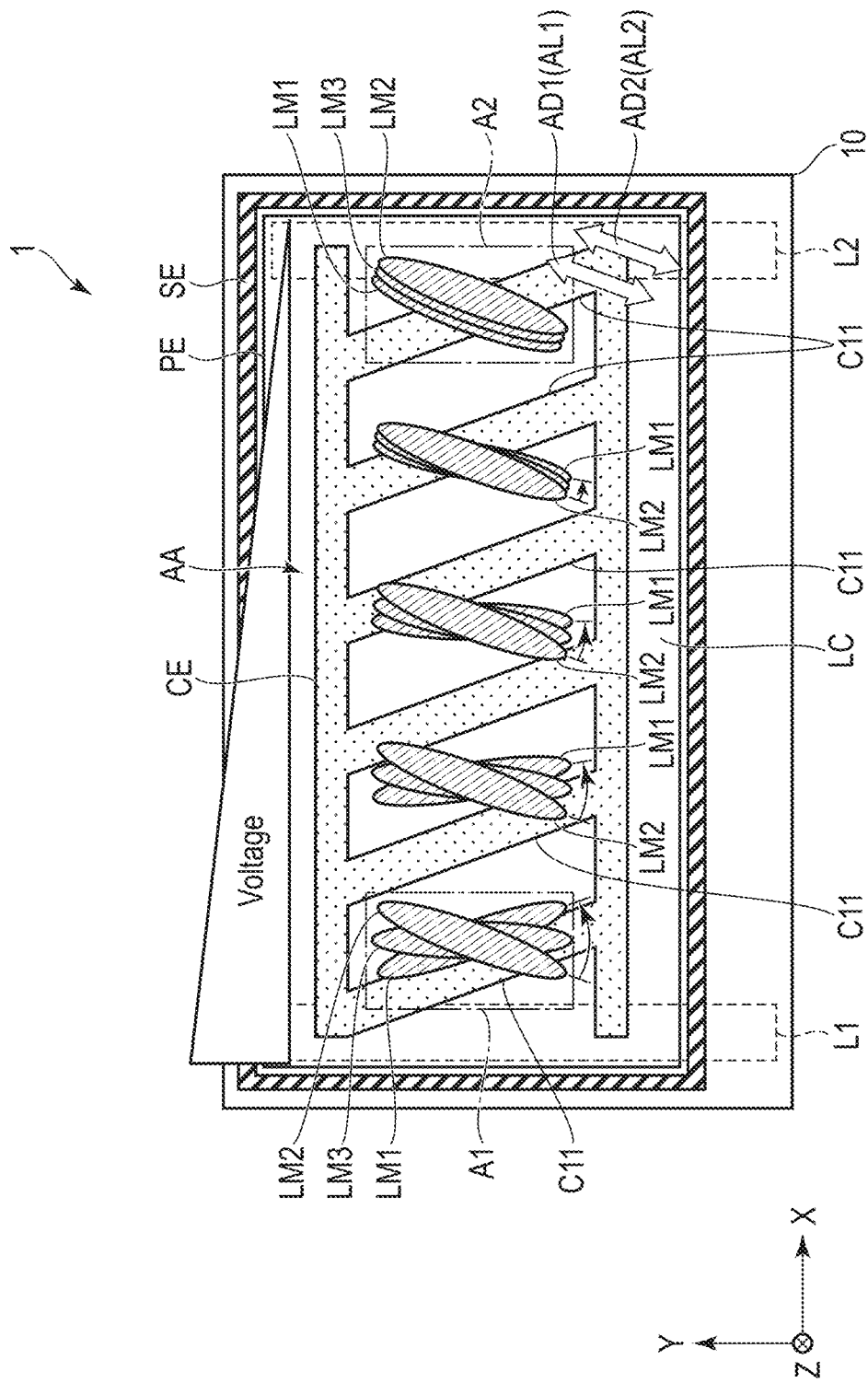
FIG. 6 shows the alignment state of the liquid crystal molecules LM in an on state where a potential difference arises between the planar electrode PE and the control electrode CE.

FIG. 5 and FIG. 6 are diagrams for explaining the alignment state of the liquid crystal molecules LM in the polarization conversion element 1 comprising the first substrate SUB1 shown in FIG. 2. Here, the second substrate SUB2 is omitted from the figures and the alignment state of the liquid crystal molecules LM arranged in the third direction Z is shown in plan view. As the liquid crystal molecules LM, liquid crystal molecules LM1 near the first substrate SUB1 (or near the first alignment film AL1), liquid crystal molecules LM2 near the second substrate SUB2 (or near the second alignment film AL2), and liquid crystal molecules LM3 located between the liquid crystal molecules LM1 and the liquid crystal molecules LM2 (in an intermediate layer of the liquid crystal layer LC) are shown in the figure.

FIG. 5 shows the alignment state of the liquid crystal molecules LM in the off state where no potential difference arises between the planar electrode PE and the control electrode CE. The first strip electrodes C11 of the control electrode CE overlap substantially all the area of the active area AA including a first area A1 near the first wiring L1 and a second area A2 near the second wiring L2.

In substantially all the area of the active area AA, the liquid crystal molecules LM1 to LM3 are initially aligned in the alignment treatment directions AD1 and AD2. When the second direction Y is defined as a reference direction, the alignment treatment directions AD1 and AD2 cross the second direction Y at a clockwise acute angle θ2, and further cross the extension direction EX1 of the first strip electrodes C11. The angle θ2 is substantially equal to the angle θ1 formed by the extension direction EX1 of the first strip electrodes C11 and the second direction Y.

FIG. 6 shows the alignment state of the liquid crystal molecules LM in the on state where a potential difference arises between the planar electrode PE and the control electrode CE. The applied voltage of the first wiring L1 is higher than the applied voltage of the second wiring L2, and the planar electrode PE has a voltage gradient as shown in the figure.

At this time, the potential difference between the planar electrode PE and the control electrode CE in the first area A1 is greater than the potential difference between the planar electrode PE and the control electrode CE in the second area A2. For example, the potential difference between the planar electrode PE and the control electrode CE in the second area A2 is substantially zero. Therefore, of the liquid crystal molecules LM1 near the first substrate SUB1, the liquid crystal molecule LM1 in the second area A2 is maintained substantially in the initial alignment state, whereas the liquid crystal molecule LM1 in the first area A1 is aligned in a direction different from the initial alignment direction.

The liquid crystal molecules LM1 are negative liquid crystal molecules and are aligned to cross an electric field between the first strip electrodes C11 and the planar electrode PE. Accordingly, if the maximum voltage for driving the liquid crystal molecule LM1 in the first area A1 is applied, the liquid crystal molecule LM1 is aligned such that its major axis is substantially parallel to the extension direction EX1 of the first strip electrodes C11 in the X-Y plane.

In the X-Y plane, when the angles formed by the major axes of the liquid crystal molecules LM1 in the off state and the major axes of the liquid crystal molecules LM1 in the on state are defined as displacement angles, the displacement angle of the liquid crystal molecule LM1 in the first area A1 is the greatest and the displacement angle of the liquid crystal molecule LM1 in the second area A2 is the smallest.

As described above, the planar electrode PE has a voltage gradient such that the voltage decreases gradually from the first wiring L1 side to the second wiring L2 side. Therefore, the potential difference between the planar electrode PE and the control electrode CE decreases gradually from the first area A1 to the second area A2. Accordingly, the displacement angles of the liquid crystal molecules LM1 decrease gradually from the first area A1 to the second area A2.

On the other hand, the liquid crystal molecules LM2 near the second substrate SUB2 are maintained substantially in the initial alignment state in substantially all the area of the active area AA including the first area A1 and the second area A2.

Therefore, in each area, the respective major axes of the liquid crystal molecules LM arranged in the third direction Z are aligned twistedly counterclockwise from the second substrate SUB2 to the first substrate SUB1.

In the X-Y plane, when the angles formed by the major axes of the liquid crystal molecules LM1 and the major axes of the liquid crystal molecules LM2 are defined as twist angles, the twist angle of the first area A1 is greater than the twist angle of the second area A2. In addition, the twist angle of the first area A1 is the greatest and the twist angle of the second area A2 is the smallest. The twist angles decrease gradually from the first area A1 to the second area A2.

Figure 7:
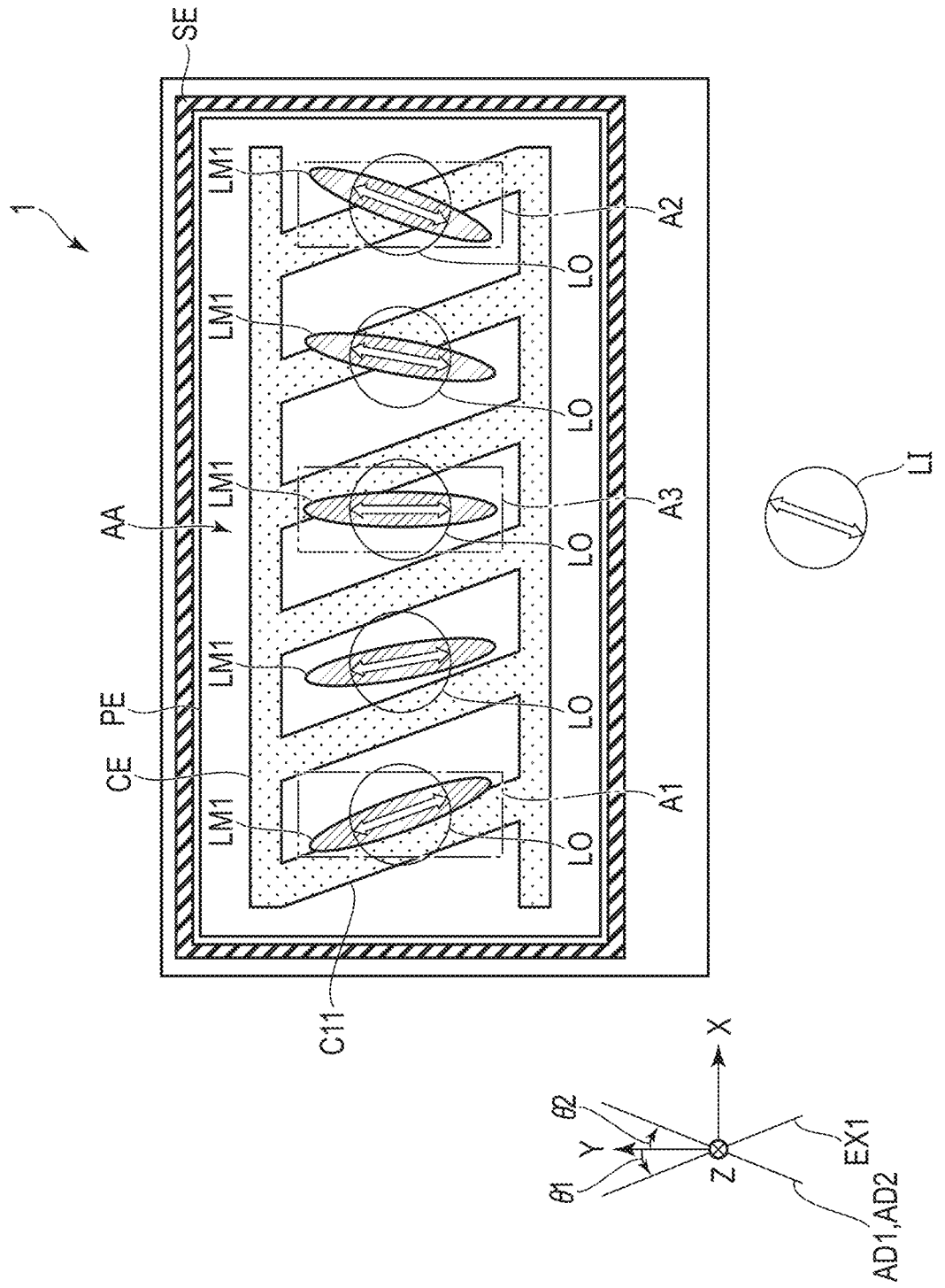
FIG. 7 is a diagram for explaining the action of the polarization conversion element 1 in the on state.

FIG. 7 is a diagram for explaining the action of the polarization conversion element 1 in the on state. FIG. 7 illustrates only the structures necessary for explanation.

In the example shown in FIG. 7, light incident on the polarization conversion element 1 is linearly polarized light LI having a polarization axis parallel to the alignment treatment directions AD1 and AD2 (or the initial alignment direction of the liquid crystal molecules). The polarization axis is indicated by an arrow enclosed in a circle. Light emitted from the polarization conversion element 1 is light LO having a polarization axis varying according to the transmissive area of the polarization conversion element 1. Light LO is linearly polarized light or elliptically polarized light.

In the second area A2, the major axis of the liquid crystal molecule LM1 is substantially parallel to the alignment treatment direction AD1. Therefore, the polarization axis of light LO transmitted through the second area A2 is substantially parallel to the alignment treatment direction AD1, etc., and the polarized state of linearly polarized light LI is maintained.

In the first area A1, the major axis of the liquid crystal molecule LM1 is substantially parallel to the extension direction EX1 of the first strip electrodes C11. Therefore, the polarization axis of light LO transmitted through the first area A1 is substantially parallel to the extension direction EX1. In addition, the polarization axis of light LO transmitted through the first area A1 and the polarization axis of light LO transmitted through the second area A2 are in line symmetry with respect to the second direction Y.

In a third area A3 located substantially in the middle between the first area A1 and the second area A2, the major axis of the liquid crystal molecule LM1 is substantially parallel to the second direction Y. Therefore, the polarization axis of light LO transmitted through the third area A3 is substantially parallel to the second direction Y.

That is, the polarization axis of light LO, which is light emitted from the polarization conversion element 1, is substantially parallel to the major axes of the liquid crystal molecules LM1 in the on state. Accordingly, the polarization conversion element 1 can emit light LO having a polarization axis in a desired direction in the X-Y plane.

Several control examples of the polarization conversion element 1 will be described next. Note that the applied voltage of each wiring described in the following control examples is an example and the applied voltages are not limited to this.

Figure 8:
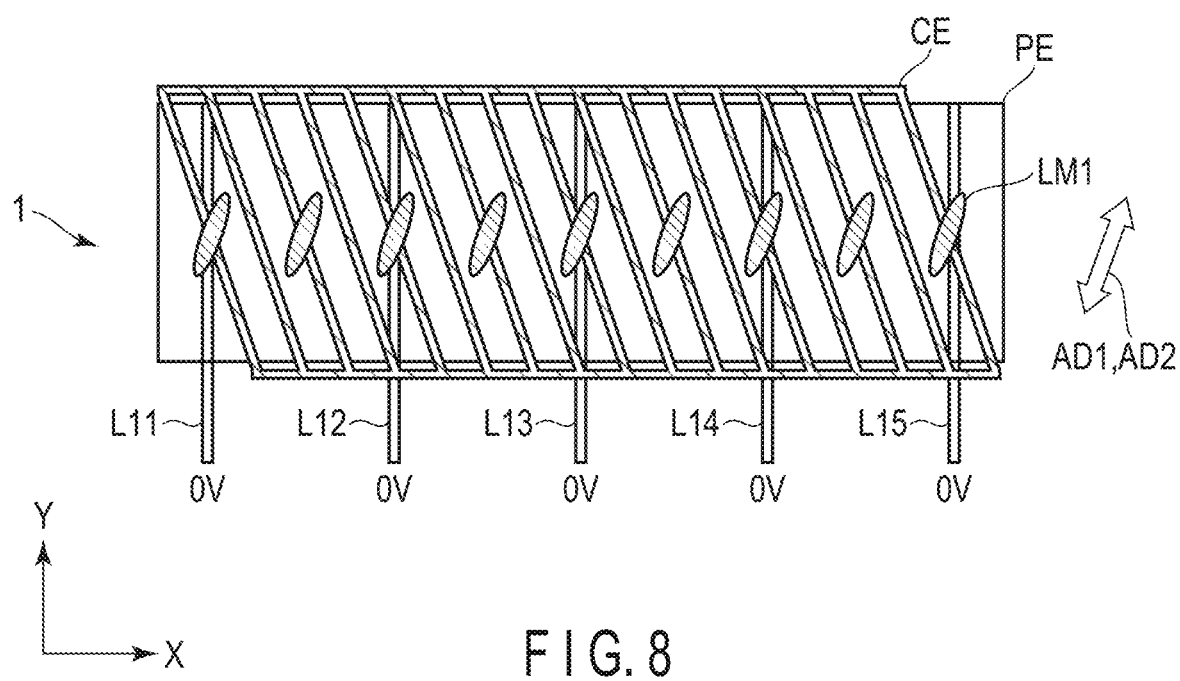
FIG. 8 is a diagram showing the alignment state of liquid crystal molecules LM1 at the off time.

FIG. 8 is a diagram showing the alignment state of the liquid crystal molecules LM1 at the off time.

The five wirings L11 to L15 each contact the planar electrode PE. The wirings L11 to L15 are arranged at regular intervals in the first direction X. The wiring L13 is located substantially in the middle between the wiring L11 and the wiring L15.

The respective applied voltages of the wirings L11 to L15 are 0 V. At this time, no potential difference is formed between the control electrode CE and the planar electrode PE, and the liquid crystal molecules LM1 are each initially aligned in the alignment treatment directions AD1 and AD2.

Figure 9:
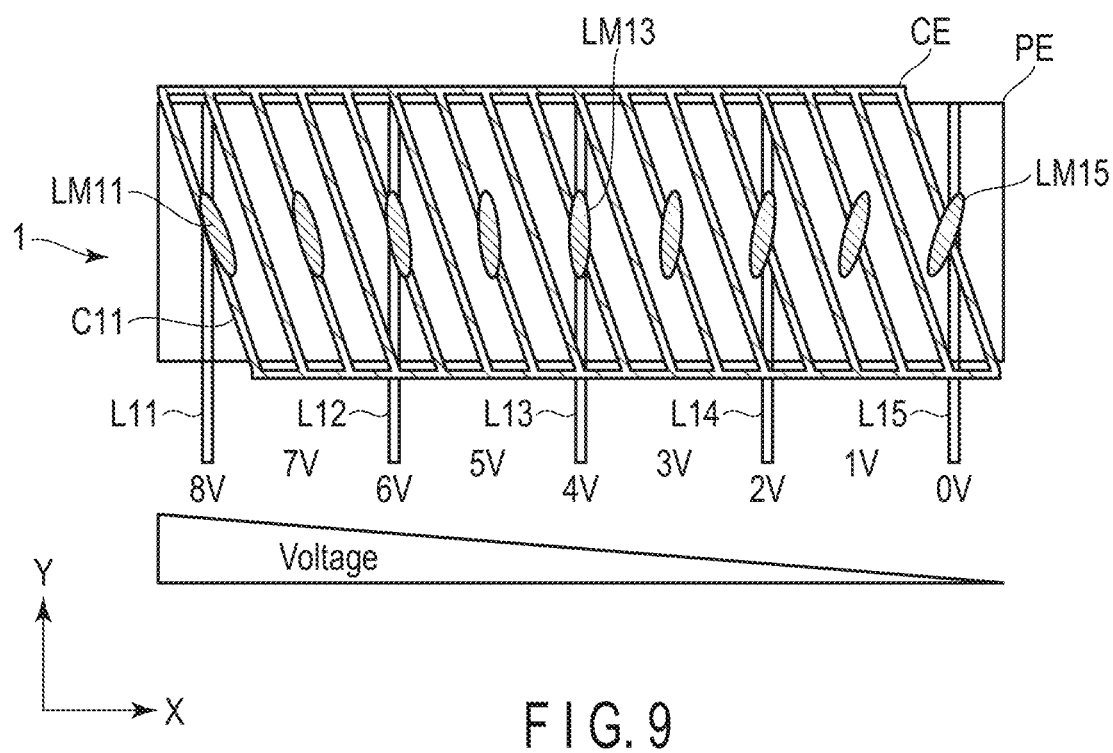
FIG. 9 is a diagram showing the alignment state of the liquid crystal molecules LM1 of Control Example 1.

FIG. 9 is a diagram showing the alignment state of the liquid crystal molecules LM1 of Control Example 1.

The applied voltage of the wiring L11 is 8 V, the applied voltage of the wiring L12 is 6 V, the applied voltage of the wiring L13 is 4 V, the applied voltage of the wiring L14 is 2 V, and the applied voltage of the wiring L15 is 0 V.

As a result, in the planar electrode PE, the voltage near the position contacting the wiring L11 is 8 V, the voltage between the wiring L11 and the wiring L12 is 7 V, the voltage near the position contacting the wiring L12 is 6 V, the voltage between the wiring L12 and the wiring L13 is 5 V, the voltage near the position contacting the wiring L13 is 4 V, the voltage between the wiring L13 and the wiring L14 is 3 V, the voltage near the position contacting the wiring L14 is 2 V, the voltage between the wiring L14 and the wiring L15 is 1 V, and the voltage near the position contacting the wiring L15 is 0 V, forming a voltage gradient of the planar electrode PE.

The potential difference between the control electrode CE and the planar electrode PE decreases gradually from the wiring L11 to the wiring L15. If the applied voltage of the control electrode CE is 0 V, the potential difference of the area overlapping the wiring L15 is 0 V.

As a result, of the liquid crystal molecules LM1, a liquid crystal molecule LM11 near the wiring L11 is aligned along the first strip electrodes C11, a liquid crystal molecule LM15 near the wiring L15 is maintained in the initial alignment state, and a liquid crystal molecule LM13 near the wiring L13 is aligned in the second direction Y. The liquid crystal molecules LM11 and LM15 are aligned in line symmetry with respect to the liquid crystal molecule LM13.

Figure 10:
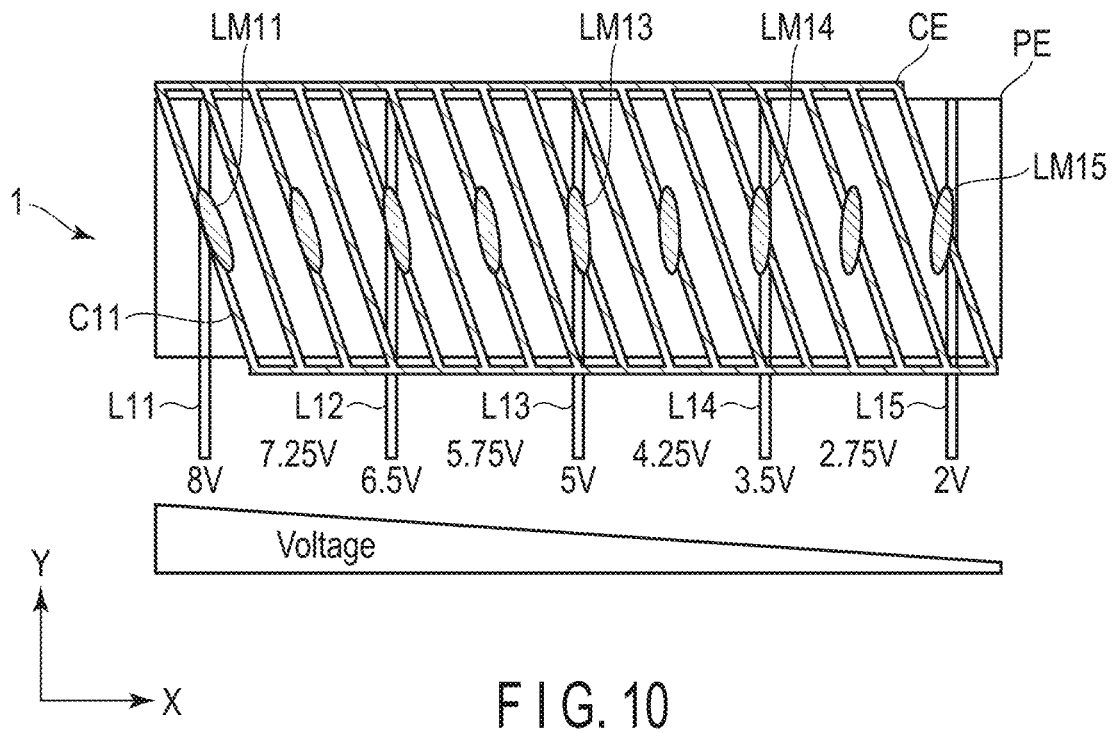
FIG. 10 is a diagram showing the alignment state of the liquid crystal molecules LM1 of Control Example 2.

FIG. 10 is a diagram showing the alignment state of the liquid crystal molecules LM1 of Control Example 2.

The applied voltage of the wiring L11 is 8 V, the applied voltage of the wiring L12 is 6.5 V, the applied voltage of the wiring L13 is 5 V, the applied voltage of the wiring L14 is 3.5 V, and the applied voltage of the wiring L15 is 2 V.

As a result, in the planar electrode PE, the voltage near the position contacting the wiring L11 is 8 V, the voltage between the wiring L11 and the wiring L12 is 7.25 V, the voltage near the position contacting the wiring L12 is 6.5 V, the voltage between the wiring L12 and the wiring L13 is 5.75 V, the voltage near the position contacting the wiring L13 is 5 V, the voltage between the wiring L13 and the wiring L14 is 4.25 V, the voltage near the position contacting the wiring L14 is 3.5 V, the voltage between the wiring L14 and the wiring L15 is 2.75 V, and the voltage near the position contacting the wiring L15 is 2 V, forming a voltage gradient of the planar electrode PE.

The potential difference between the control electrode CE and the planar electrode PE decreases gradually from the wiring L11 to the wiring L15. If the applied voltage of the control electrode CE is 0 V, the potential difference of the area overlapping the wiring L15 is 2 V.

As a result, of the liquid crystal molecules LM1, the liquid crystal molecule LM11 near the wiring L11 is aligned along the first strip electrodes C11, the liquid crystal molecule LM15 near the wiring L15 is aligned in a direction different from the initial alignment direction, and a liquid crystal molecule LM14 near the wiring L14 is aligned in the second direction Y. The liquid crystal molecule LM13 near the wiring L13 and the liquid crystal molecule LM15 are aligned in line symmetry with respect to the liquid crystal molecule LM14.

Figure 11:
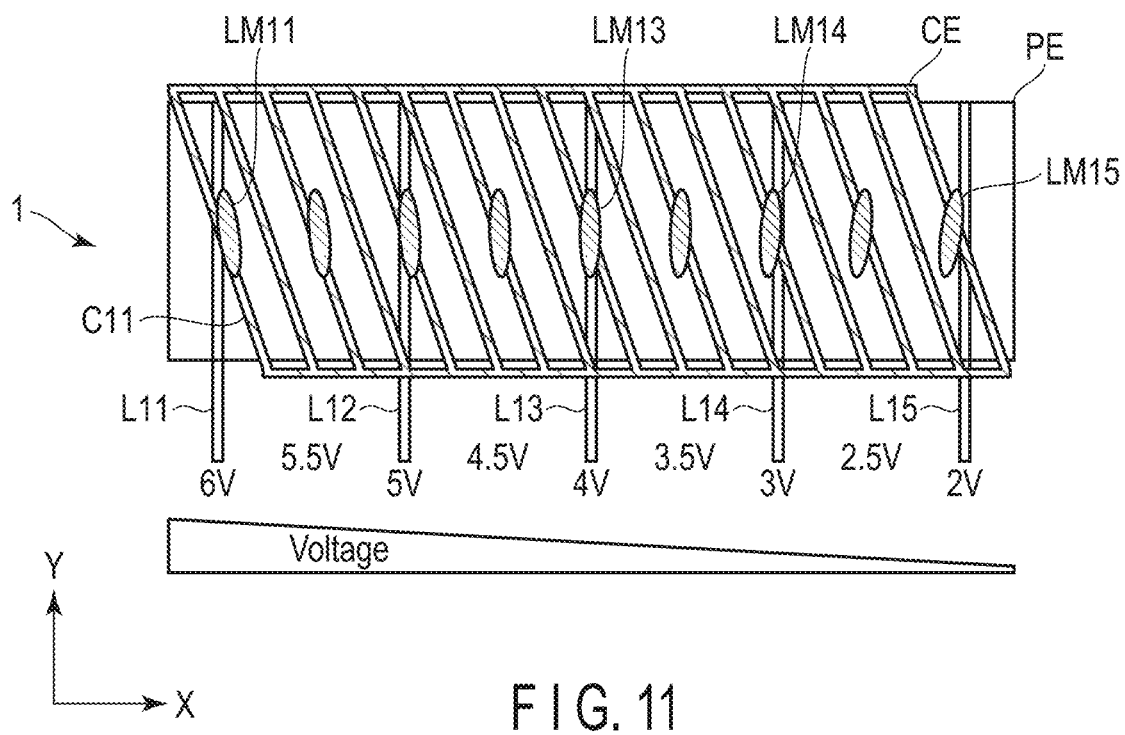
FIG. 11 is a diagram showing the alignment state of the liquid crystal molecules LM1 of Control Example 3.

FIG. 11 is a diagram showing the alignment state of the liquid crystal molecules LM1 of Control Example 3.

The applied voltage of the wiring L11 is 6 V, the applied voltage of the wiring L12 is 5 V, the applied voltage of the wiring L13 is 4 V, the applied voltage of the wiring L14 is 3 V, and the applied voltage of the wiring L15 is 2 V.

As a result, in the planar electrode PE, the voltage near the position contacting the wiring L11 is 6 V, the voltage between the wiring L11 and the wiring L12 is 5.5 V, the voltage near the position contacting the wiring L12 is 5 V, the voltage between the wiring L12 and the wiring L13 is 4.5 V, the voltage near the position contacting the wiring L13 is 4 V, the voltage between the wiring L13 and the wiring L14 is 3.5 V, the voltage near the position contacting the wiring L14 is 3 V, the voltage between the wiring L14 and the wiring L15 is 2.5 V, and the voltage near the position contacting the wiring L15 is 2 V, forming a voltage gradient of the planar electrode PE.

The potential difference between the control electrode CE and the planar electrode PE decreases gradually from the wiring L11 to the wiring L15. If the applied voltage of the control electrode CE is 0 V, the potential difference of the area overlapping the wiring L15 is 2 V.

As a result, of the liquid crystal molecules LM1, the liquid crystal molecule LM11 near the wiring L11 is aligned along the first strip electrodes C11, the liquid crystal molecule LM15 near the wiring L15 is aligned in a direction different from the initial alignment direction, and the liquid crystal molecule LM13 near the wiring L13 is aligned in the second direction Y. Note that the applied voltage of the wiring L11 is lower than the applied voltages of the examples shown in FIG. 9 and FIG. 10. Thus, the displacement angle of the liquid crystal molecule LM11 is smaller than the displacement angles of the examples shown in FIG. 9 and FIG. 10. The liquid crystal molecules LM11 and LM15 are aligned in line symmetry with respect to the liquid crystal molecule LM13.

The polarization axis of light LO transmitted through the respective polarization conversion elements 1 of Control Examples 1 to 3, described above, will be described next.

Figure 12:
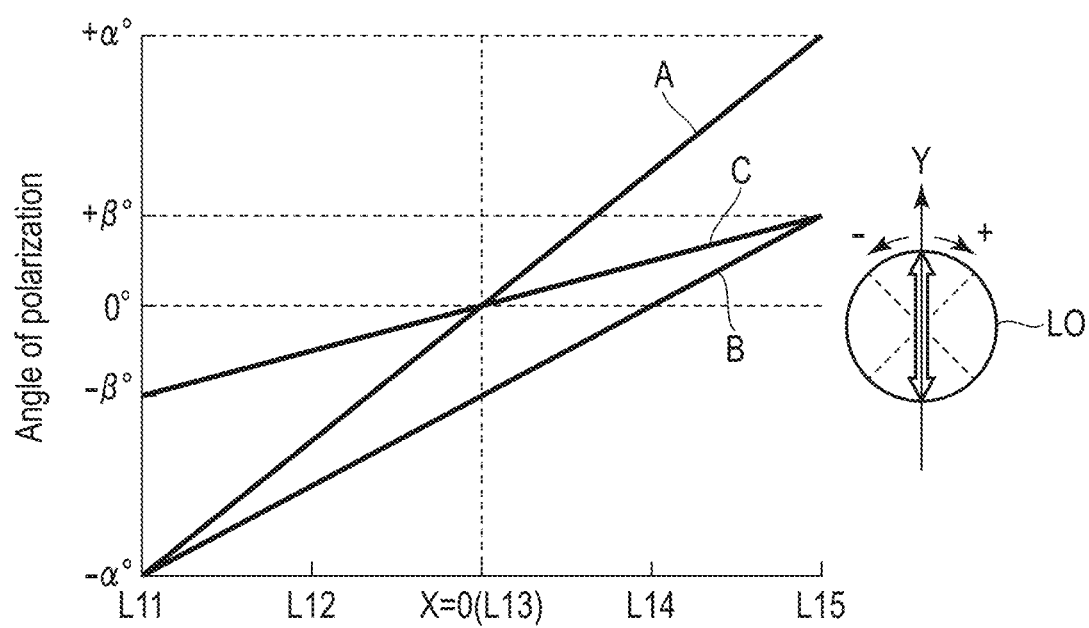
FIG. 12 is a diagram showing the relationship between the position in a first direction X of the polarization conversion element 1 and the angle of polarization of light LO.

FIG. 12 is a diagram showing the relationship between the position in the first direction X of the polarization conversion element 1 and the angle of polarization of light LO. The horizontal axis corresponds to the position in the first direction X of the polarization conversion element 1 when the position of the wiring L13 is defined as X=0. The vertical axis corresponds to the angle of polarization of light LO. The angle of polarization when the polarization axis is parallel to the second direction Y is expressed as the angle of polarization=0°, a clockwise angle with respect to the second direction Y is expressed as a positive (+) angle, and a counterclockwise angle with respect to the second direction Y is expressed as a negative (−) angle.

In Control Example 1, as indicated by A in the figure, a distribution of angles of polarization from −α° to +α° with the position of the wiring L13 at the center can be obtained. α can be set as appropriate by the initial alignment direction of the liquid crystal molecules LM and the extension direction EX1 of the first strip electrodes C11. That is, −α° is equal to θ1 shown in FIG. 5 and +α° is equal to θ2 shown in FIG. 5.

In Control Example 2, as indicated by B in the figure, a distribution of angles of polarization from −α° to +β° can be obtained. Note that β° is an angle smaller than α°. In addition, the position where the angle of polarization is 0° can be shifted to a position different from the center (X=0) of the polarization conversion element 1.

In Control Example 3, as indicated by C in the figure, a distribution of angles of polarization from −β° to +β° with the position of the wiring L13 at the center can be obtained. β can be set as appropriate by controlling the voltage applied to the liquid crystal molecules LM1 (or the applied voltages of the wirings L11 to L15).

Second Embodiment

Figure 13:
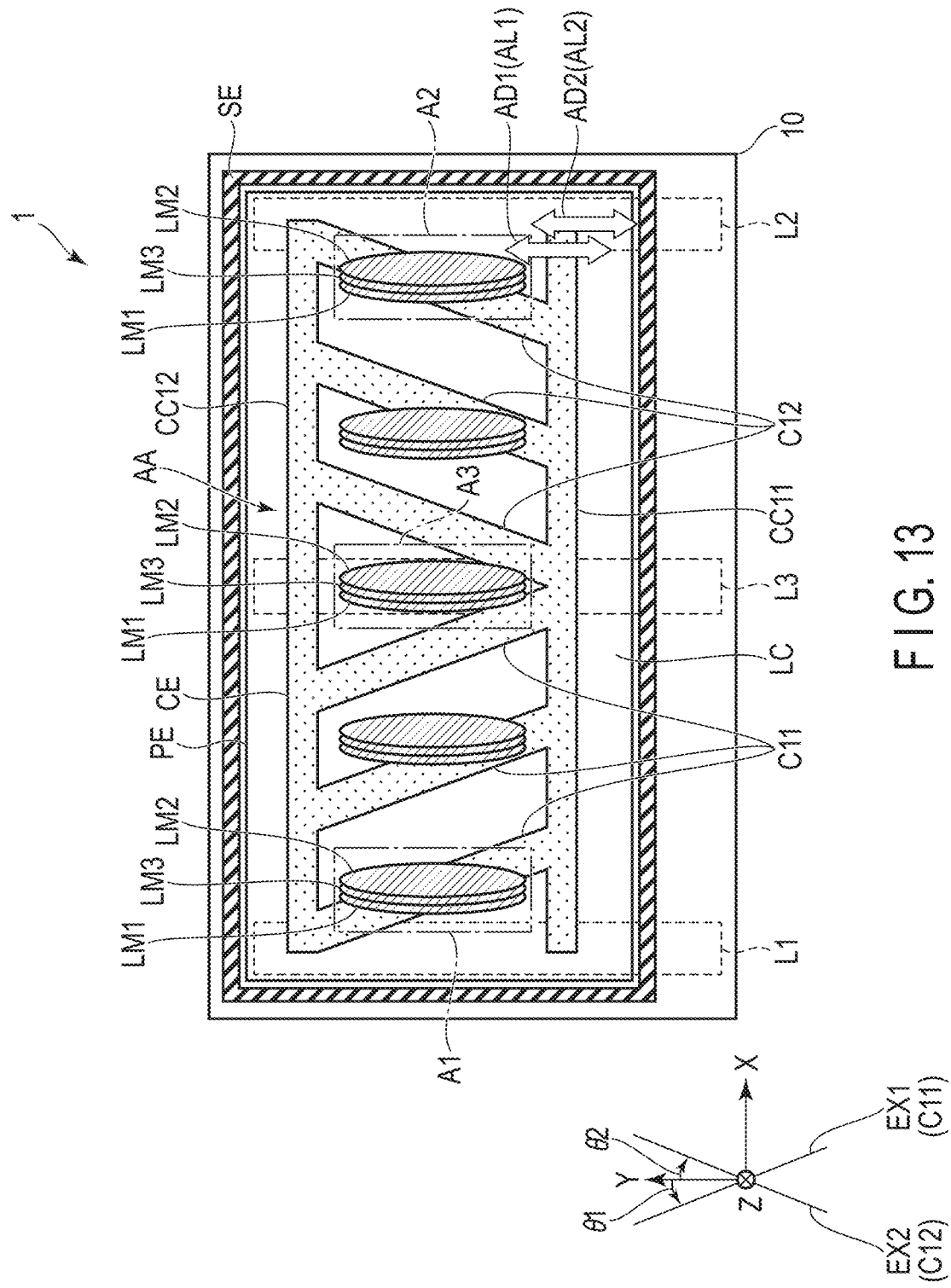
FIG. 13 is a plan view showing a configuration example of the polarization conversion element 1 shown in FIG. 1.

FIG. 13 is a plan view showing a configuration example of the polarization conversion element 1 shown in FIG. 1. Here, the second substrate SUB2 is omitted from the figure and the alignment state of the liquid crystal molecules LM arranged in the third direction Z is shown in plan view. As the liquid crystal molecules LM, liquid crystal molecules LM1 near the first substrate SUB1 (or near the first alignment film AL1), liquid crystal molecules LM2 near the second substrate SUB2 (or near the second alignment film AL2), and liquid crystal molecules LM3 located between the liquid crystal molecules LM1 and the liquid crystal molecules LM2 (in an intermediate layer of the liquid crystal layer LC) are shown in the figure.

The control electrode CE overlaps the planar electrode PE. The control electrode CE comprises first strip electrodes C11, second strip electrodes C12, and strip common electrodes CC11 and CC12. The common electrodes CC11 and CC12 each extend in the first direction X and are arranged with a distance therebetween in the second direction Y.

The first strip electrodes C11 and the second strip electrodes C12 are located between the common electrode CC11 and the common electrode CC12, and are arranged with a distance therebetween in the first direction X. One end side of each of the first strip electrodes C11 and the second strip electrodes C12 is connected to the common electrode CC11. The other end side of each of the first strip electrodes C11 and the second strip electrodes C12 is connected to the common electrode CC12.

The first strip electrodes C11 extend in the same direction as in the first embodiment. When the second direction Y is defined as a reference direction, an extension direction EX1 of the first strip electrodes C11 crosses the second direction Y at a counterclockwise acute angle θ1. Each of the first strip electrodes C11 crosses the common electrodes CC11 and CC12 at an angle other than 90°. The first strip electrodes C11 overlap a first area A1 but do not overlap a second area A2.

The second strip electrodes C12 extend in the same direction. However, the second strip electrodes C12 extend in a direction different from that of the first strip electrodes C11. When the second direction Y is defined as a reference direction, an extension direction EX2 of the second strip electrodes C12 crosses the second direction Y at a clockwise acute angle θ2. Each of the second strip electrodes C12 crosses the common electrodes CC11 and CC12 at an angle other than 90°. The second strip electrodes C12 overlap the second area A2 but do not overlap the first area A1.

For example, the angles θ1 and θ2 are equal angles, and are set to the maximum value of an angle at which a polarization axis is rotated in the X-Y plane. That is, the first strip electrodes C11 and the second strip electrodes C12 are in line symmetry with respect to the second direction Y.

In the off state shown in FIG. 13, in substantially all the area of the active area AA including the first area A1, the second area A2, and a third area A3, the liquid crystal molecules LM1 to LM3 are initially aligned in the alignment treatment directions AD1 and AD2. When the second direction Y is defined as a reference direction, the alignment treatment directions AD1 and AD2 are parallel to the second direction Y.

The angle θ1 formed by the alignment treatment directions AD1 and AD2 and the extension direction EX1 of the first strip electrodes C11 is equal to the angle θ2 formed by the alignment treatment directions AD1 and AD2 and the extension direction EX2 of the second strip electrodes C12.

Figure 14:
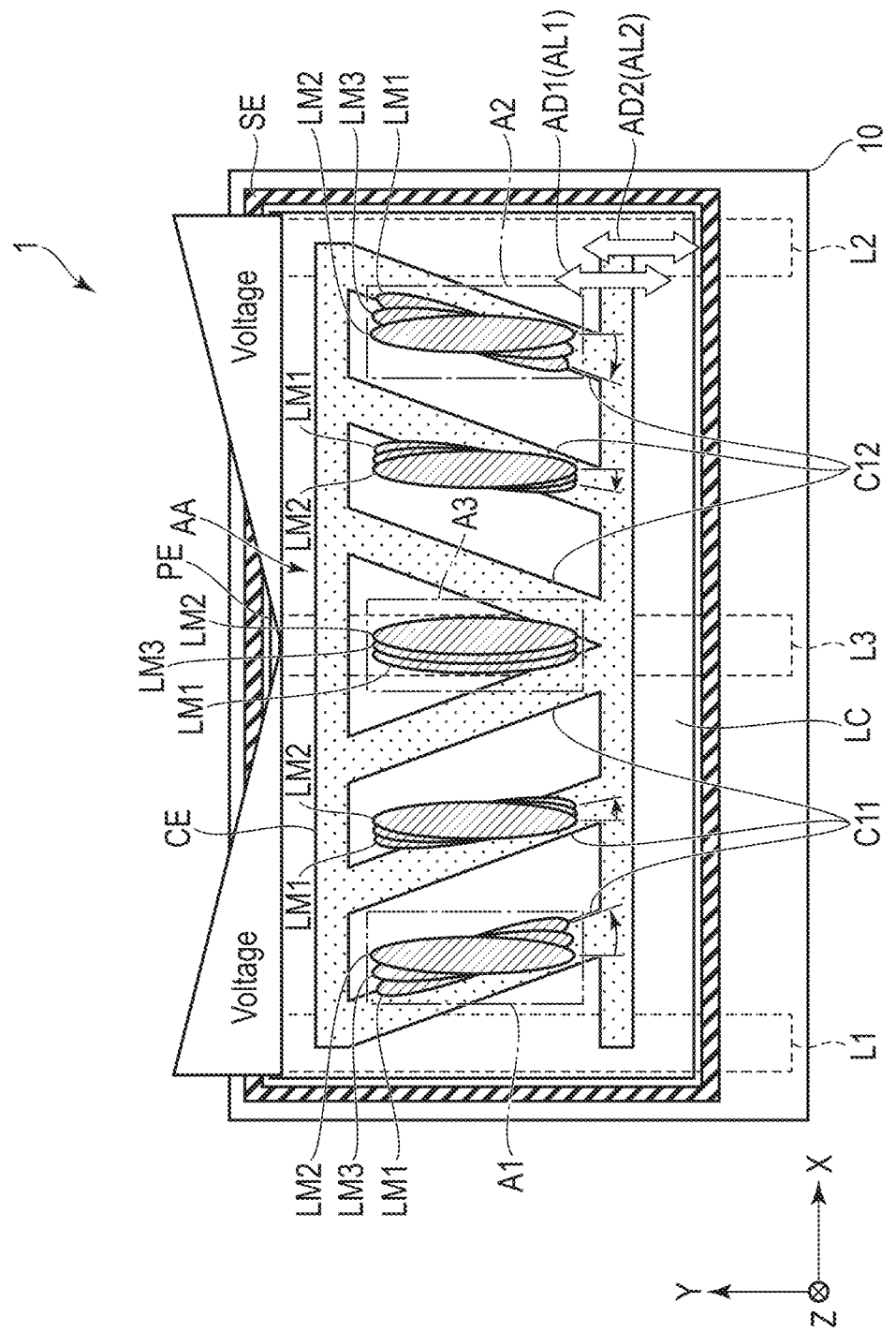
FIG. 14 shows the alignment state of the liquid crystal molecules LM in the on state.

FIG. 14 shows the alignment state of the liquid crystal molecules LM in the on state. The applied voltage of the first wiring L1 and the applied voltage of the second wiring L2 are higher than the applied voltage of a third wiring L3, and the planar electrode PE has a voltage gradient as shown in the figure.

At this time, the potential difference between the planar electrode PE and the control electrode CE in the first area A1 and the potential difference between the planar electrode PE and the control electrode CE in the second area A2 are greater than the potential difference between the planar electrode PE and the control electrode CE in the third area A3. For example, the potential difference in the third area A3 is substantially zero.

Therefore, of the liquid crystal molecules LM1 near the first substrate SUB1, the liquid crystal molecule LM1 in the third area A3 is maintained substantially in the initial alignment state, whereas the liquid crystal molecule LM1 in the first area A1 and the liquid crystal molecule LM1 in the second area A2 are aligned in directions different from the initial alignment direction.

The liquid crystal molecules LM1 are negative liquid crystal molecules, and are aligned to cross an electric field between the first strip electrodes C11 and the planar electrode PE or an electric field between the second strip electrodes C12 and the planar electrode PE.

Accordingly, if the maximum voltage for driving the liquid crystal molecule LM1 in the first area A1 is applied, the liquid crystal molecule LM1 is aligned such that its major axis is substantially parallel to the extension direction EX1 of the first strip electrodes C11 in the X-Y plane. In addition, if the maximum voltage for driving the liquid crystal molecule LM1 in the second area A2 is applied, the liquid crystal molecule LM1 is aligned such that its major axis is substantially parallel to the extension direction EX2 of the second strip electrodes C12 in the X-Y plane.

The displacement angle of the liquid crystal molecule LM1 in the first area A1 and the displacement angle of the liquid crystal molecule LM1 in the second area A2 are the greatest, and the displacement angle of the liquid crystal molecule LM1 in the third area A3 is the smallest.

As described above, the planar electrode PE has a voltage gradient such that the voltage decreases gradually from the first wiring L1 to the third wiring L3 and has a voltage gradient such that the voltage increases gradually from the third wiring L3 to the second wiring L2. Therefore, the potential difference between the planar electrode PE and the control electrode CE decreases gradually from the first area A1 to the third area A3 and increases gradually from the third area A3 to the second area A2. Accordingly, the displacement angle of the liquid crystal molecules LM1 decreases gradually from the first area A1 to the third area A3, and increases gradually from the third area A3 to the second area A2.

On the other hand, the liquid crystal molecules LM2 near the second substrate SUB2 are maintained substantially in the initial alignment state in substantially all the area of the active area AA including the first area A1, the second area A2, and the third area A3.

Therefore, in the area from the first area A1 to the third area A3, the respective major axes of the liquid crystal molecules LM arranged in the third direction Z are aligned twistedly counterclockwise from the second substrate SUB2 to the first substrate SUB1.

In addition, in the area from the third area A3 to the second area A2, the respective major axes of the liquid crystal molecules LM arranged in the third direction Z are aligned twistedly clockwise from the second substrate SUB2 to the first substrate SUB1.

The twist angles of the first area A1 and the second area A2 are greater than the twist angle of the third area A3. In addition, the twist angles of the first area A1 and the second area A2 are the greatest and the twist angle of the third area A3 is the smallest. In addition, the twist angles decrease gradually from the first area A1 to the third area A3 and increase gradually from the third area A3 to the second area A2.

Figure 15:
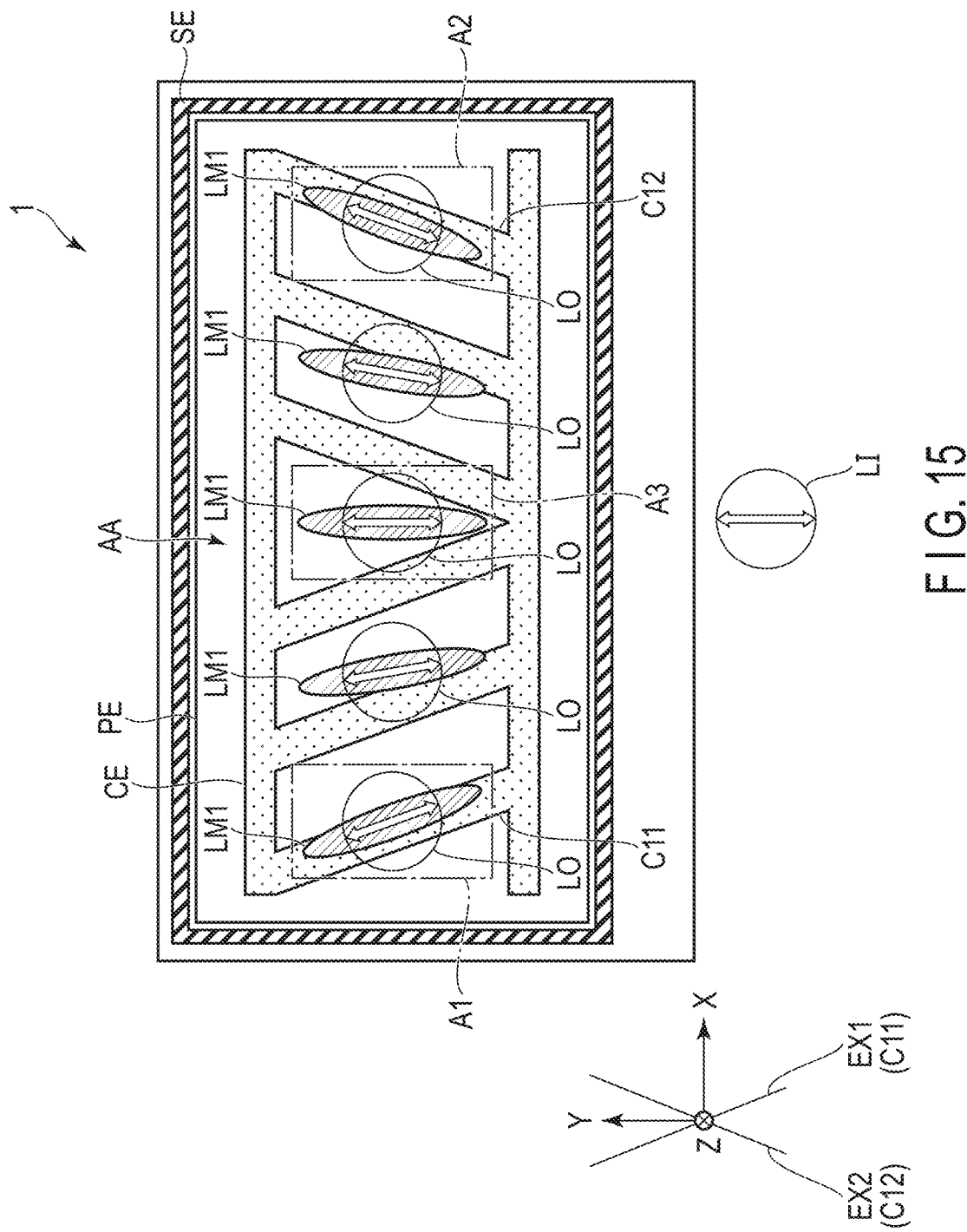
FIG. 15 is a diagram for explaining the action of the polarization conversion element 1 in the on state.

FIG. 15 is a diagram for explaining the action of the polarization conversion element 1 in the on state. FIG. 15 illustrates only the structures necessary for explanation.

In the example shown in FIG. 15, light incident on the polarization conversion element 1 is linearly polarized light LI having a polarization axis parallel to the second direction Y. Light emitted from the polarization conversion element 1 is light LO having a polarization axis varying according to the transmissive area of the polarization conversion element 1. Light LO is linearly polarized light or elliptically polarized light.

The polarization axis of light LO transmitted through the first area A1 is substantially parallel to the extension direction EX1 of the first strip electrodes C11. The polarization axis of light LO transmitted through the second area A2 is substantially parallel to the extension direction EX2 of the second strip electrodes C12. The polarization axis of light LO transmitted through the third area A3 is substantially parallel to the second direction Y and the polarized state of linearly polarized light LI is maintained. The polarization axis of light LO transmitted through the first area A1 and the polarization axis of light LO transmitted through the second area A2 are in line symmetry with respect to the second direction Y.

The polarization conversion element 1 as described above also can emit light LO having a polarization axis in a desired direction in the X-Y plane.

Several control examples of the polarization conversion element 1 will be described next. Note that the applied voltage of each wiring described in the following control examples is an example and the applied voltages are not limited to this.

Figure 16:
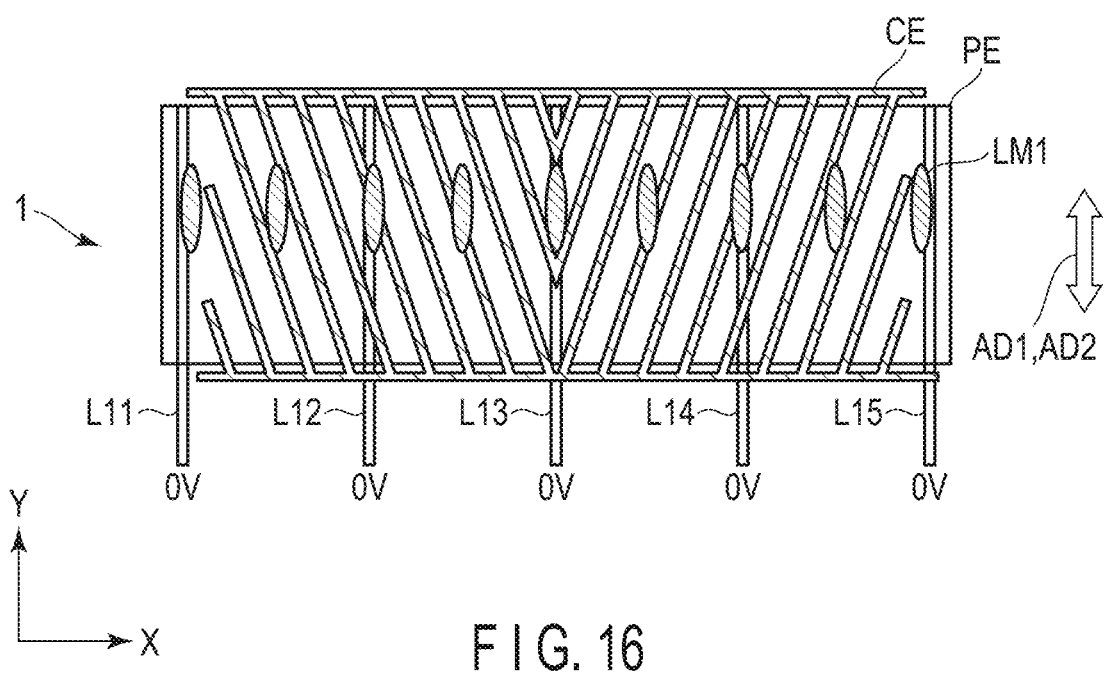
FIG. 16 is a diagram showing the alignment state of the liquid crystal molecules LM1 at the off time.

FIG. 16 is a diagram showing the alignment state of the liquid crystal molecules LM1 at the off time.

The respective applied voltages of wirings L11 to L15 are 0 V. At this time, no potential difference is formed between the control electrode CE and the planar electrode PE, and the liquid crystal molecules LM1 are each initially aligned in the alignment treatment directions AD1 and AD2 (or the second direction Y).

Figure 17:
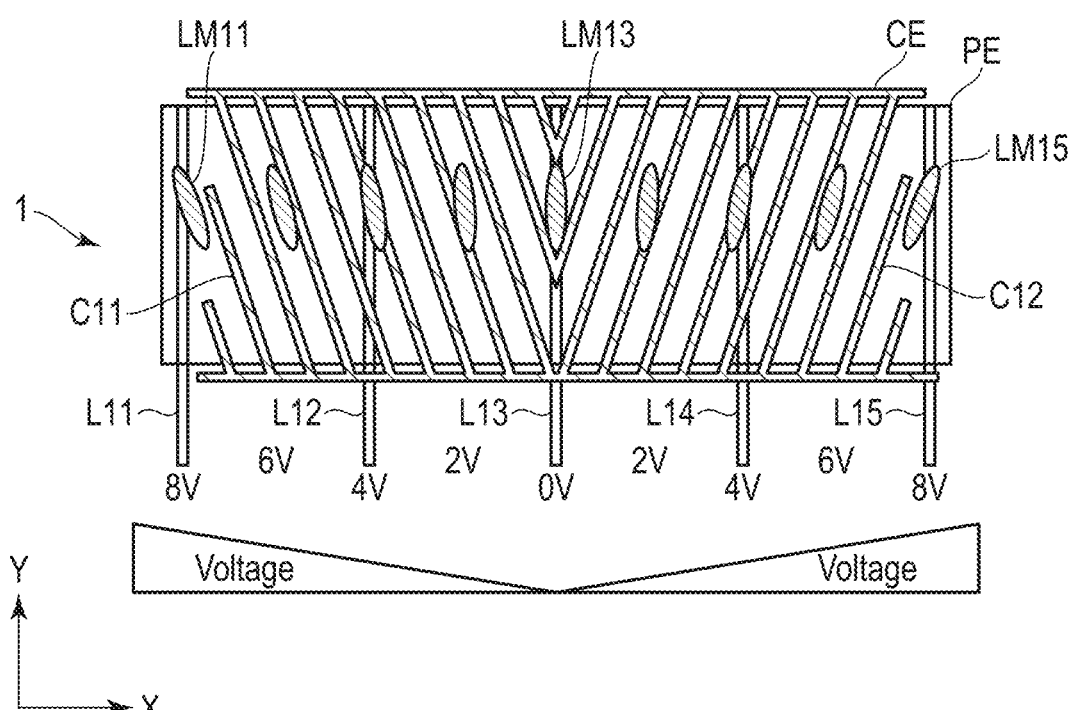
FIG. 17 is a diagram showing the alignment state of the liquid crystal molecules LM1 of Control Example 4.

FIG. 17 is a diagram showing the alignment state of the liquid crystal molecules LM1 of Control Example 4.

The applied voltage of the wiring L11 is 8 V, the applied voltage of the wiring L12 is 4 V, the applied voltage of the wiring L13 is 0 V, the applied voltage of the wiring L14 is 4 V, and the applied voltage of the wiring L15 is 8 V.

As a result, in the planar electrode PE, the voltage near the position contacting the wiring L11 is 8 V, the voltage between the wiring L11 and the wiring L12 is 6 V, the voltage near the position contacting the wiring L12 is 4 V, the voltage between the wiring L12 and the wiring L13 is 2 V, the voltage near the position contacting the wiring L13 is 0 V, the voltage between the wiring L13 and the wiring L14 is 2 V, the voltage near the position contacting the wiring L14 is 4 V, the voltage between the wiring L14 and the wiring L15 is 6 V, and the voltage near the position contacting the wiring L15 is 8 V, forming a voltage gradient of the planar electrode PE.

The potential difference between the control electrode CE and the planar electrode PE decreases gradually from the wiring L11 to the wiring L13 and increases gradually from the wiring L13 to the wiring L15. If the applied voltage of the control electrode CE is 0 V, the potential difference of the area overlapping the wiring L13 is 0 V.

As a result, of the liquid crystal molecules LM1, a liquid crystal molecule LM11 near the wiring L11 is aligned along the first strip electrodes C11, a liquid crystal molecule LM13 near the wiring L13 is maintained in the initial alignment state and aligned in the second direction Y, and a liquid crystal molecule LM15 near the wiring L15 is aligned along the second strip electrodes C12. The liquid crystal molecules LM11 and LM15 are aligned in line symmetry with respect to the liquid crystal molecule LM13.

Figure 18:
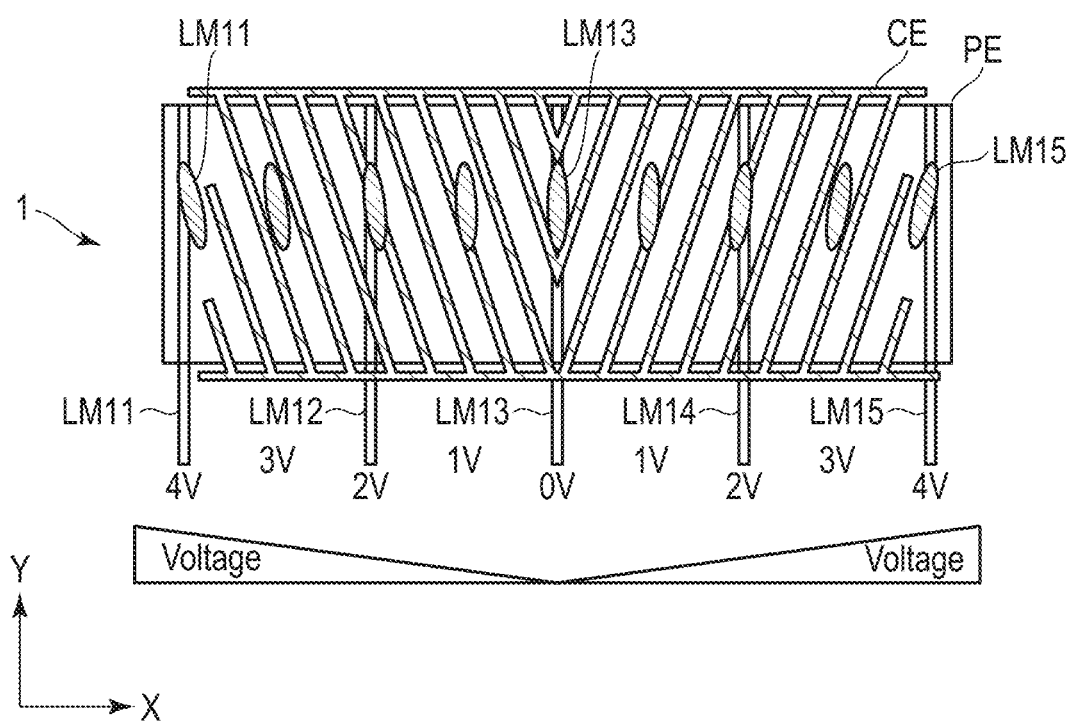
FIG. 18 is a diagram showing the alignment state of the liquid crystal molecules LM1 of Control Example 5.

FIG. 18 is a diagram showing the alignment state of the liquid crystal molecules LM1 of Control Example 5.

The applied voltage of the wiring L11 is 4 V, the applied voltage of the wiring L12 is 2 V, the applied voltage of the wiring L13 is 0 V, the applied voltage of the wiring L14 is 2 V, and the applied voltage of the wiring L15 is 4 V.

As a result, in the planar electrode PE, the voltage near the position contacting the wiring L11 is 4 V, the voltage between the wiring L11 and the wiring L12 is 3 V, the voltage near the position contacting the wiring L12 is 2 V, the voltage between the wiring L12 and the wiring L13 is 1 V, the voltage near the position contacting the wiring L13 is 0 V, the voltage between the wiring L13 and the wiring L14 is 1 V, the voltage near the position contacting the wiring L14 is 2 V, the voltage between the wiring L14 and the wiring L15 is 3 V, and the voltage near the position contacting the wiring L15 is 4 V, forming a voltage gradient of the planar electrode PE.

The potential difference between the control electrode CE and the planar electrode PE decreases gradually from the wiring L11 to the wiring L13 and increases gradually from the wiring L13 to the wiring L15. If the applied voltage of the control electrode CE is 0 V, the potential difference of the area overlapping the wiring L13 is 0 V.

As a result, of the liquid crystal molecules LM1, the liquid crystal molecule LM11 near the wiring L11 is aligned along the first strip electrodes C11, the liquid crystal molecule LM15 near the wiring L15 is aligned along the second strip electrodes C12, and the liquid crystal molecule LM13 near the wiring L13 is aligned in the second direction Y. Note that the applied voltage of the wiring L11 and the applied voltage of the wiring L15 are lower than the applied voltages of the example shown in FIG. 17. Thus, the respective displacement angles of the liquid crystal molecule LM11 and the liquid crystal molecule LM15 are smaller than the displacement angles of the example shown in FIG. 17. The liquid crystal molecules LM11 and LM15 are aligned in line symmetry with respect to the liquid crystal molecule LM13.

The polarization axis of light LO transmitted through the respective polarization conversion elements 1 of Control Examples 4 and 5, described above, will be described next.

FIG. 19 is a diagram showing the relationship between the position in the first direction X of the polarization conversion element 1 and the angle of polarization of light LO.

In Control Example 4, as indicated by D in the figure, a distribution of angles of polarization from $-\alpha°$ to $+\alpha°$ with the position of the wiring L13 at the center can be obtained. $\alpha$ can be set as appropriate by the extension direction EX1 of the first strip electrodes C11 and the extension direction EX2 of the second strip electrodes C12. That is, $-\alpha°$ is equal to $\theta1$ shown in FIG. 13 and $+\alpha°$ is equal to $\theta2$ shown in FIG. 13.

In Control Example 5, as indicated by E in the figure, a distribution of angles of polarization from $-\beta°$ to $+r$ with the position of the wiring L13 at the center can be obtained. Note that $\beta°$ is an angle smaller than $\alpha°$. $\beta$ can be set as appropriate by controlling the voltage applied to the liquid crystal molecules LM1 (or the applied voltages of the wirings L11 to L15).

While the above-described first and second embodiments illustrate cases where the liquid crystal layer LC is composed of a negative liquid crystal material, the following third and fourth embodiments illustrate cases where the liquid crystal layer LC is composed of a positive liquid crystal material.

Third Embodiment

Figure 20:
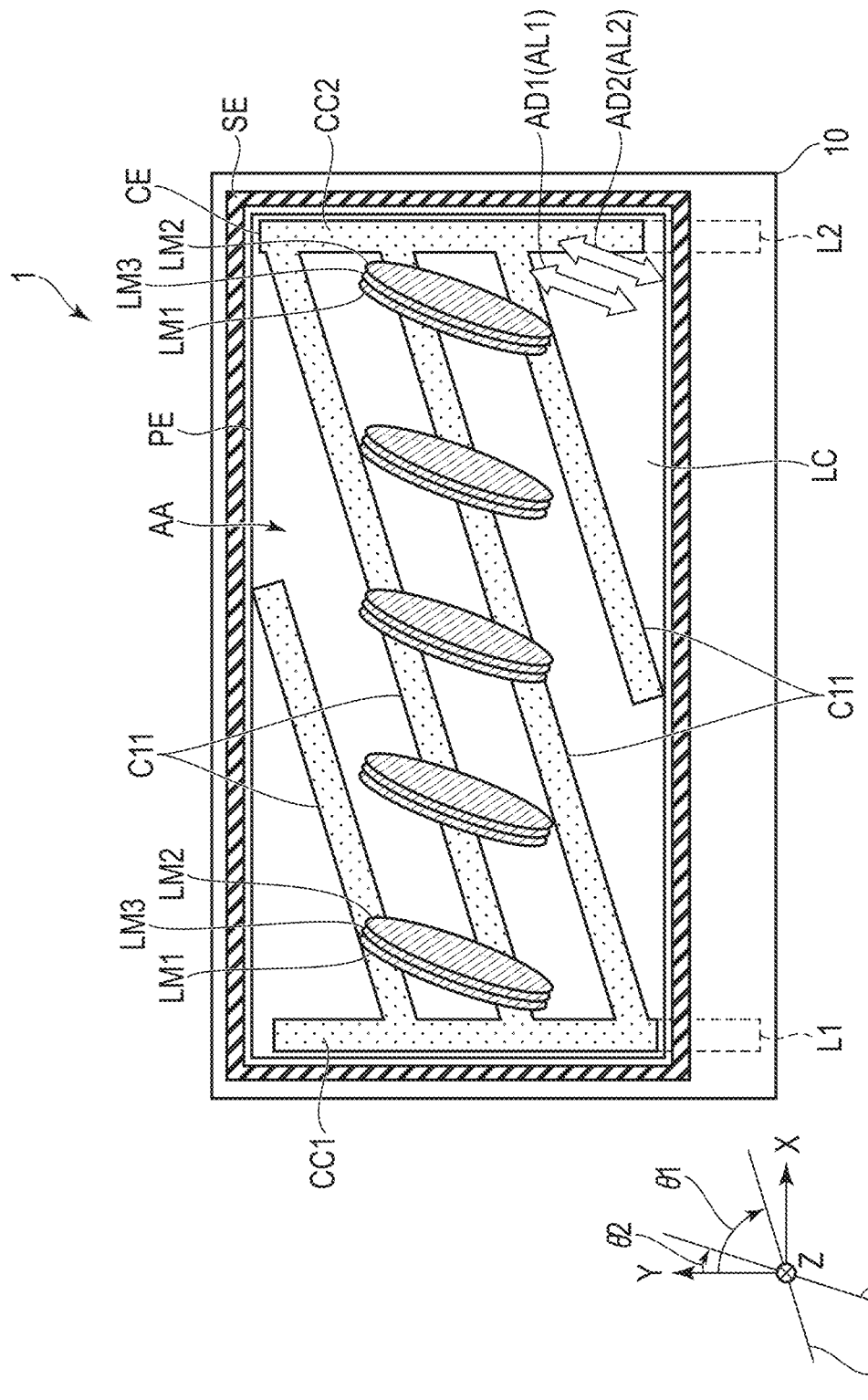
FIG. 20 is a plan view showing a configuration example of the polarization conversion element 1 shown in FIG. 1.

FIG. 20 is a plan view showing a configuration example of the polarization conversion element 1 shown in FIG. 1. Here, the second substrate SUB2 is omitted from the figure and the alignment state of the liquid crystal molecules LM arranged in the third direction Z is shown in plan view. As the liquid crystal molecules LM, liquid crystal molecules LM1, liquid crystal molecules LM2, and liquid crystal molecules LM3 are shown in the figure.

The control electrode CE overlaps the planar electrode PE. The control electrode CE comprises first strip electrodes C11 and strip common electrodes CC1 and CC2. The common electrodes CC1 and CC2 each extend in the second direction Y and are arranged with a distance therebetween in the first direction X.

The first strip electrodes C11 are located between the common electrode CC1 and the common electrode CC2, are arranged with a distance therebetween in the second direction Y, and are connected to at least one of the common electrode CC1 and the common electrode CC2.

The first strip electrodes C11 extend in the same direction. When the second direction Y is defined as a reference direction, an extension direction EX1 of the first strip electrodes C11 crosses the second direction Y at a clockwise acute angle $\theta1$. Each of the first strip electrodes C11 crosses the common electrodes CC1 and CC2 at an angle other than 90°. In addition, when the second direction Y is defined as a reference direction, the alignment treatment directions AD1 and AD2 cross the second direction Y at a clockwise acute angle $\theta2$. The angle $\theta2$ is smaller than the angle $\theta1$. For example, the angle $\theta1$ is greater than 45°, and should preferably be greater than or equal to 80° in order to maintain linearly polarized light. In addition, the angle $\theta2$ is smaller than 45°, and should preferably be smaller than or equal to 10° in order to maintain linearly polarized light.

In the off state shown in FIG. 20, as described with reference to FIG. 5, in substantially all the area of the active area AA, the liquid crystal molecules LM1 to LM3 are initially aligned in the alignment treatment directions AD1 and AD2.

FIG. 21 shows the alignment state of the liquid crystal molecules LM in the on state. The applied voltage of the first wiring L1 is higher than the applied voltage of the second wiring L2, and the planar electrode PE has a voltage gradient as shown in the figure.

At this time, the potential difference between the planar electrode PE and the control electrode CE in a first area A1 is greater than the potential difference between the planar electrode PE and the control electrode CE in a second area A2. For example, the potential difference between the planar electrode PE and the control electrode CE in the second area A2 is substantially zero.

Therefore, of the liquid crystal molecules LM1 near the first substrate SUB1, the liquid crystal molecule LM1 in the second area A2 is maintained substantially in the initial alignment state, whereas the liquid crystal molecule LM1 in the first area A1 is aligned in a direction different from the initial alignment direction.

The liquid crystal molecules LM1 are positive liquid crystal molecules and are aligned to extend along an electric field between the first strip electrodes C11 and the planar electrode PE.

Accordingly, if the maximum voltage for driving the liquid crystal molecule LM1 in the first area A1 is applied, the liquid crystal molecule LM1 is aligned such that its major axis is substantially orthogonal to the extension direction EX1 of the first strip electrodes C11 in the X-Y plane.

The displacement angle of the liquid crystal molecule LM1 in the first area A1 is the greatest and the displacement angle of the liquid crystal molecule LM1 in the second area A2 is the smallest.

As described above, the planar electrode PE has a voltage gradient such that the voltage decreases gradually from the first wiring L1 to the second wiring L2. Therefore, the potential difference between the planar electrode PE and the control electrode CE decreases gradually from the first area A1 to the second area A2. Accordingly, the displacement angles of the liquid crystal molecules LM1 decrease gradually from the first area A1 to the second area A2.

On the other hand, the liquid crystal molecules LM2 near the second substrate SUB2 are maintained substantially in the initial alignment state in substantially all the area of the active area AA including the first area A1 and the second area A2.

Therefore, in each area, the respective major axes of the liquid crystal molecules LM arranged in the third direction Z are aligned twistedly counterclockwise from the second substrate SUB2 to the first substrate SUB1.

The twist angle of the first area A1 is the greatest and the twist angle of the second area A2 is the smallest. In addition, the twist angles decrease gradually from the first area A1 to the second area A2. That is, in the third embodiment where the liquid crystal layer LC is composed of a positive liquid crystal material, too, the polarization conversion element 1 having the same optical action as in the above-described first embodiment is provided.

Several control examples of the polarization conversion element 1 will be described next. Note that the applied voltage of each wiring described in the following control examples is an example and the applied voltages are not limited to this.

Figure 22:
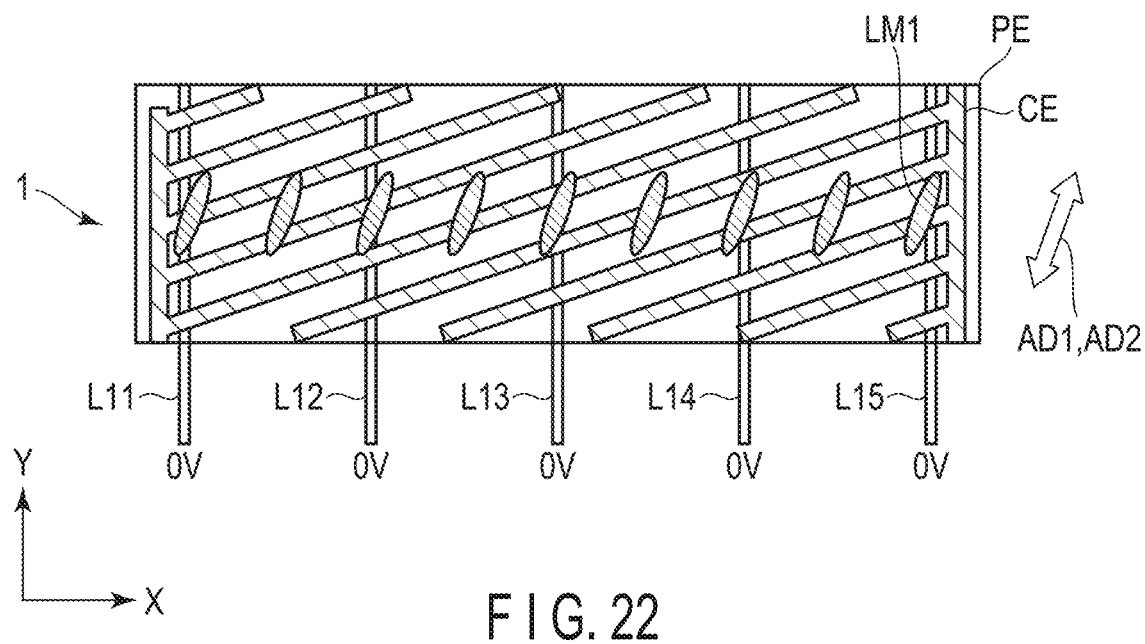
FIG. 22 is a diagram showing the alignment state of the liquid crystal molecules LM1 at the off time.

FIG. 22 is a diagram showing the alignment state of the liquid crystal molecules LM1 at the off time.

The respective applied voltages of wirings L11 to L15 are 0 V. At this time, no potential difference is formed between the control electrode CE and the planar electrode PE, and the liquid crystal molecules LM1 are each initially aligned in the alignment treatment directions AD1 and AD2.

Figure 23:
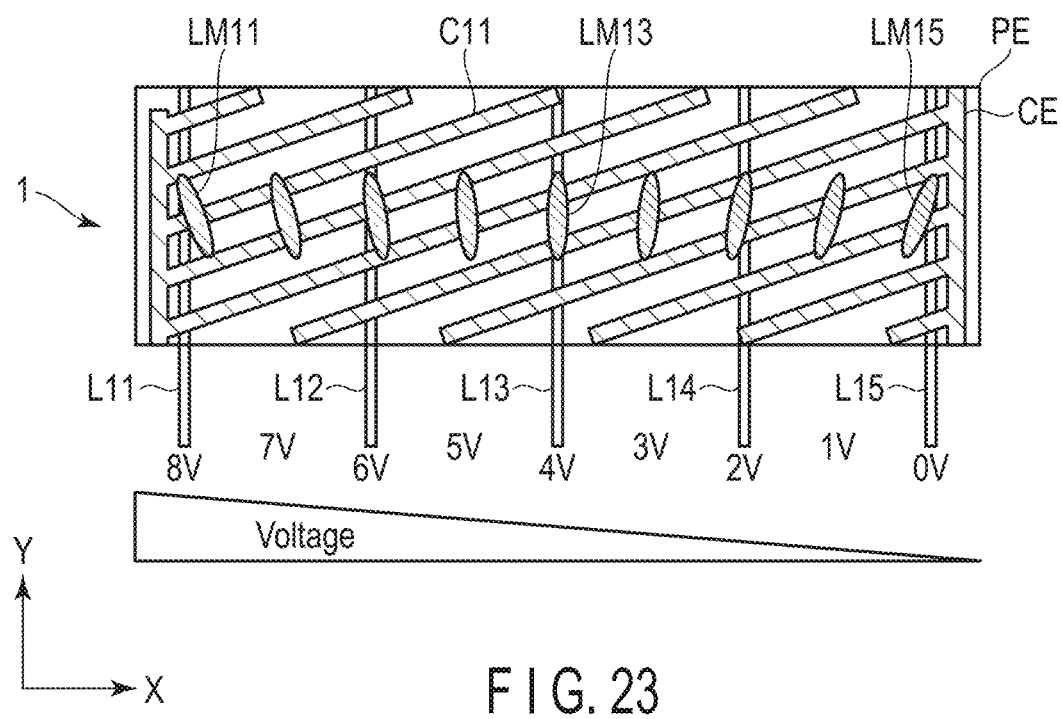
FIG. 23 is a diagram showing the alignment state of the liquid crystal molecules LM1 of Control Example 6.

FIG. 23 is a diagram showing the alignment state of the liquid crystal molecules LM1 of Control Example 6.

The applied voltage of the wiring L11 is 8 V, the applied voltage of the wiring L12 is 6 V, the applied voltage of the wiring L13 is 4 V, the applied voltage of the wiring L14 is 2 V, and the applied voltage of the wiring L15 is 0 V. As a result, a voltage gradient as shown in the figure is formed in the planar electrode PE. Details of the voltage gradient are the same as described with reference to FIG. 9.

The potential difference between the control electrode CE and the planar electrode PE decreases gradually from the wiring L11 to the wiring L15. If the applied voltage of the control electrode CE is 0 V, the potential difference of the area overlapping the wiring L15 is 0 V.

As a result, of the liquid crystal molecules LM1, a liquid crystal molecule LM11 near the wiring L11 is aligned to be substantially orthogonal to the first strip electrodes C11, a liquid crystal molecule LM15 near the wiring L15 is maintained in the initial alignment state, and a liquid crystal molecule LM13 near the wiring L13 is aligned in the second direction Y. The liquid crystal molecules LM11 and LM15 are aligned in line symmetry with respect to the liquid crystal molecule LM13.

Figure 24:
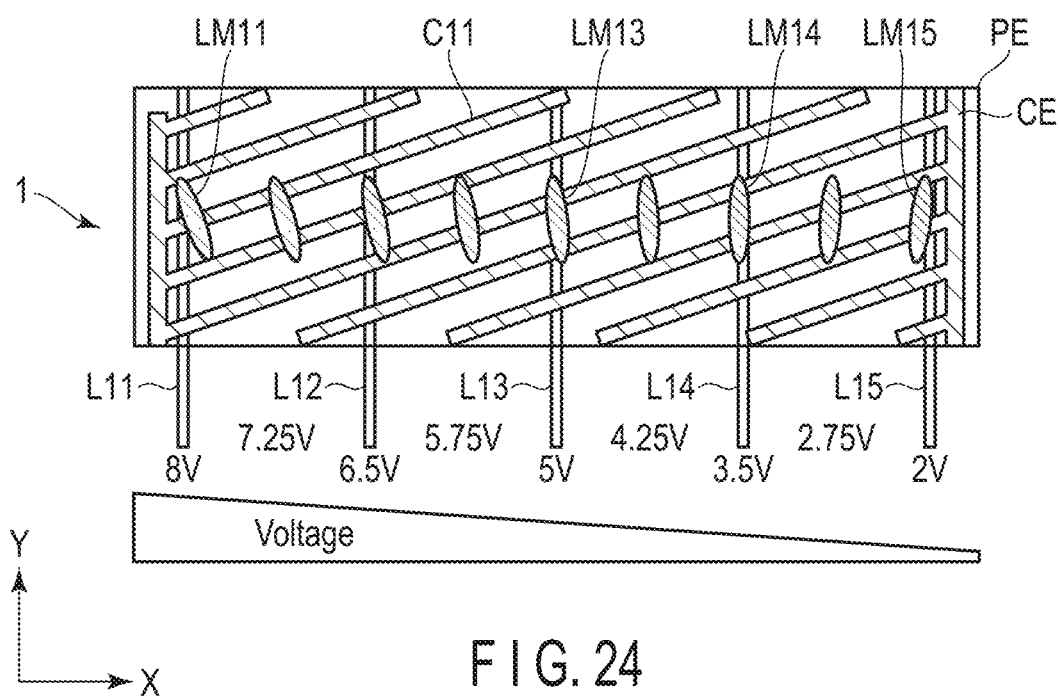
FIG. 24 is a diagram showing the alignment state of the liquid crystal molecules LM1 of Control Example 7.

FIG. 24 is a diagram showing the alignment state of the liquid crystal molecules LM1 of Control Example 7.

The applied voltage of the wiring L11 is 8 V, the applied voltage of the wiring L12 is 6.5 V, the applied voltage of the wiring L13 is 5 V, the applied voltage of the wiring L14 is 3.5 V, and the applied voltage of the wiring L15 is 2 V. As a result, a voltage gradient as shown in the figure is formed in the planar electrode PE. Details of the voltage gradient are the same as described with reference to FIG. 10.

The potential difference between the control electrode CE and the planar electrode PE decreases gradually from the wiring L11 to the wiring L15. If the applied voltage of the control electrode CE is 0 V, the potential difference of the area overlapping the wiring L15 is 2 V.

As a result, of the liquid crystal molecules LM1, the liquid crystal molecule LM11 near the wiring L11 is aligned to be substantially orthogonal to the first strip electrodes C11, the liquid crystal molecule LM15 near the wiring L15 is aligned in a direction different from the initial alignment direction, a liquid crystal molecule LM14 near the wiring L14 is aligned in the second direction Y. The liquid crystal molecule LM13 near the wiring L13 and the liquid crystal molecule LM15 are aligned in line symmetry with respect to the liquid crystal molecule LM14.

Figure 25:
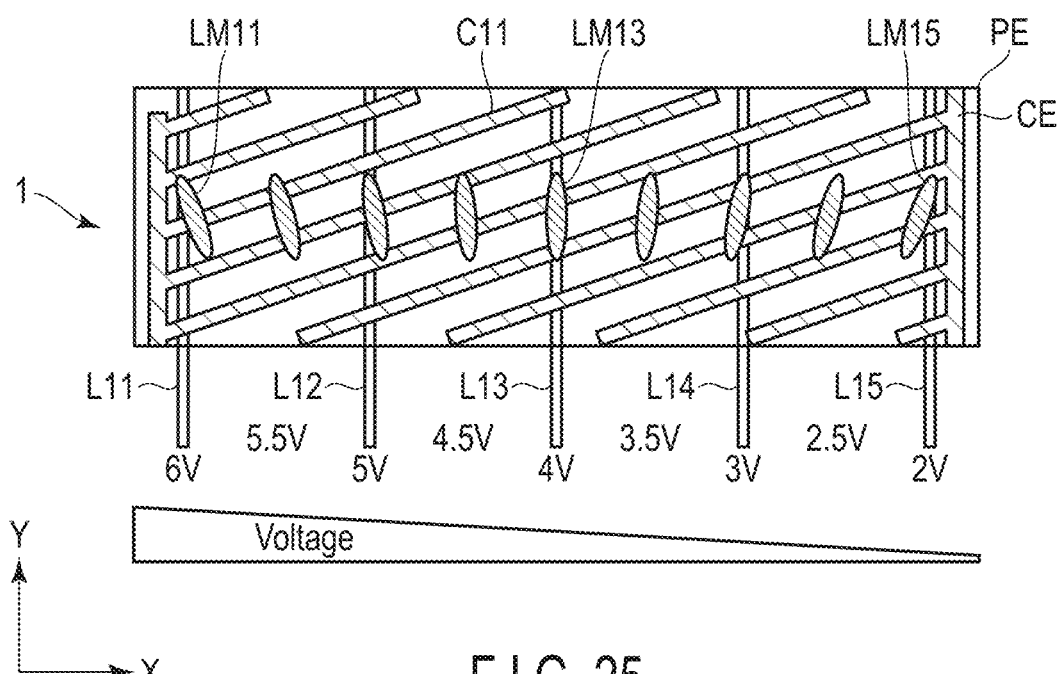
FIG. 25 is a diagram showing the alignment state of the liquid crystal molecules LM1 of Control Example 8.

FIG. 25 is a diagram showing the alignment state of the liquid crystal molecules LM1 of Control Example 8.

The applied voltage of the wiring L11 is 6 V, the applied voltage of the wiring L12 is 5 V, the applied voltage of the wiring L13 is 4 V, the applied voltage of the wiring L14 is 3 V, and the applied voltage of the wiring L15 is 2 V. As a result, a voltage gradient as shown in the figure is formed in the planar electrode PE. Details of the voltage gradient are the same as described with reference to FIG. 11.

The potential difference between the control electrode CE and the planar electrode PE decreases gradually from the wiring L11 to the wiring L15. If the applied voltage of the control electrode CE is 0 V, the potential difference of the area overlapping the wiring L15 is 2 V.

As a result, of the liquid crystal molecules LM1, the liquid crystal molecule LM11 near the wiring L11 is aligned to cross the first strip electrodes C11, the liquid crystal molecule LM15 near the wiring L15 is aligned in a direction different from the initial alignment direction, and the liquid crystal molecule LM13 near the wiring L13 is aligned in the second direction Y. Note that the applied voltage of the wiring L11 is lower than the applied voltages of the examples shown in FIG. 23 and FIG. 24. Thus, the displacement angle of the liquid crystal molecule LM11 is smaller than the displacement angles of the examples shown in FIG. 23 and FIG. 24. The liquid crystal molecules LM11 and LM15 are aligned in line symmetry with respect to the liquid crystal molecule LM13.

In the above-described third embodiment, too, the same advantages as those explained above can be obtained.

Fourth Embodiment

Figure 26:
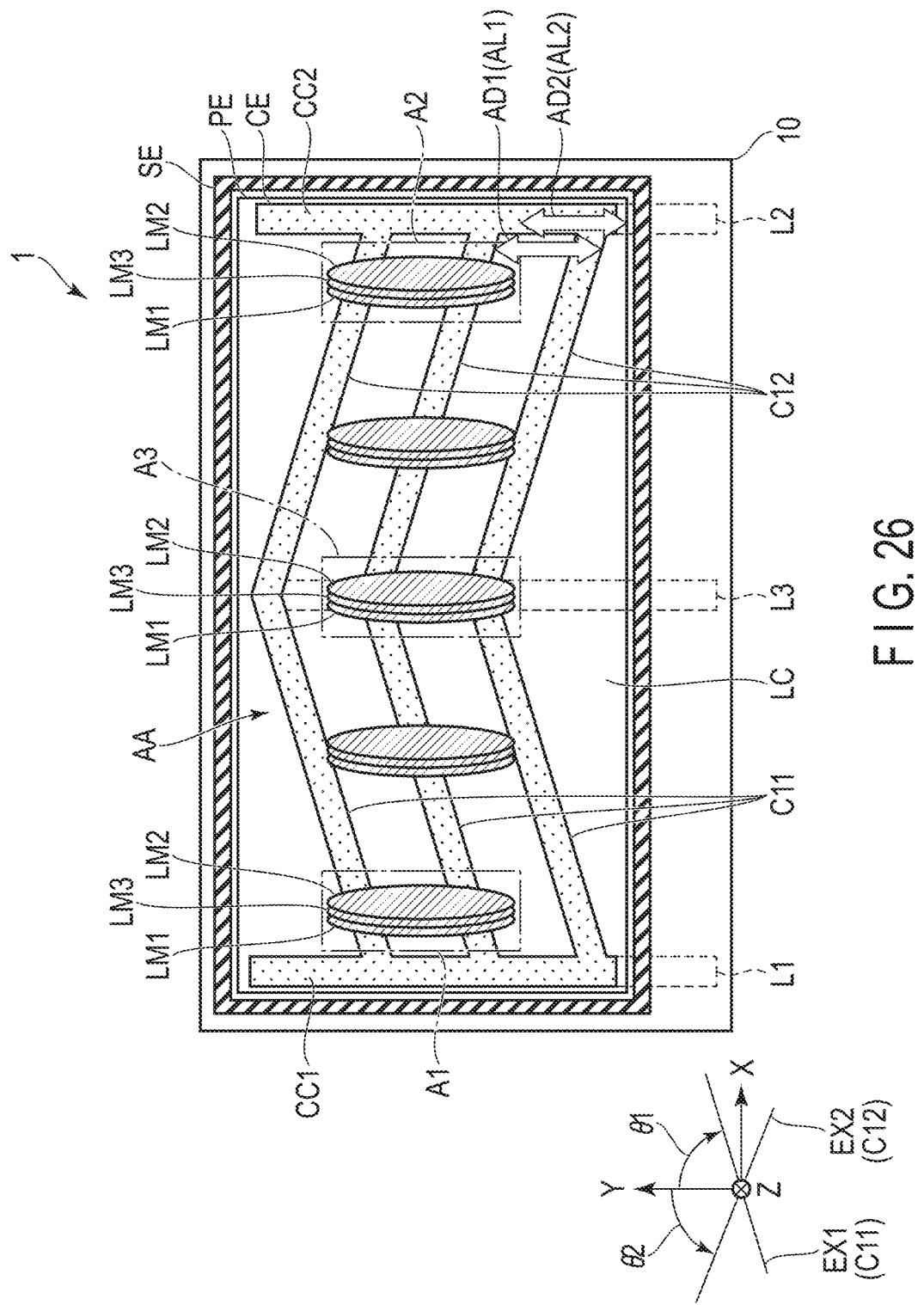
FIG. 26 is a plan view showing a configuration example of the polarization conversion element 1 shown in FIG. 1.

FIG. 26 is a plan view showing a configuration example of the polarization conversion element 1 shown in FIG. 1. Here, the second substrate SUB2 is omitted from the figure and the alignment state of the liquid crystal molecules LM arranged in the third direction Z is shown in plan view. As the liquid crystal molecules LM, liquid crystal molecules LM1, liquid crystal molecules LM2, and liquid crystal molecules LM3 are shown in the figure.

The control electrode CE overlaps the planar electrode PE. The control electrode CE comprises first strip electrodes C11, second strip electrodes C12, and strip common electrodes CC1 and CC2. The common electrodes CC1 and CC2 each extend in the second direction Y and are arranged with a distance therebetween in the first direction X.

The first strip electrodes C11 and the second strip electrodes C12 are located between the common electrode CC1 and the common electrode CC2, and are arranged with a distance therebetween in the second direction Y. One end side of each of the first strip electrodes C11 is connected to the common electrode CC1. One end side of each of the second strip electrodes C12 is connected to the common electrode CC2. In addition, the first strip electrodes C11 and the second strip electrodes C12 are connected to each other substantially in the middle of the active area AA (or the area overlapping a third wiring L3).

The first strip electrodes C11 extend in the same direction as in the third embodiment. When the second direction Y is defined as a reference direction, an extension direction EX1 of the first strip electrodes C11 crosses the second direction Y at a clockwise acute angle θ1. Each of the first strip electrodes C11 crosses the common electrodes CC1 and CC2 at an angle other than 90°.

The second strip electrodes C12 extend in the same direction. However, the second strip electrodes C12 extend in a direction different from that of the first strip electrodes C11. When the second direction Y is defined as a reference direction, an extension direction EX2 of the second strip electrodes C12 crosses the second direction Y at a counter-clockwise acute angle θ2. Each of the second strip electrodes C12 crosses the common electrodes CC1 and CC2 at an angle other than 90°.

For example, the angles θ1 and θ2 are equal angles. That is, the first strip electrodes C11 and the second strip electrodes C12 are in line symmetry with respect to the second direction Y.

In the off state shown in FIG. 26, as described with reference to FIG. 13, in substantially all the area of the active area AA, the liquid crystal molecules LM1 to LM3 are initially aligned in the alignment treatment directions AD1 and AD2. When the second direction Y is defined as a reference direction, the alignment treatment directions AD1 and AD2 are parallel to the second direction Y.

Figure 27:
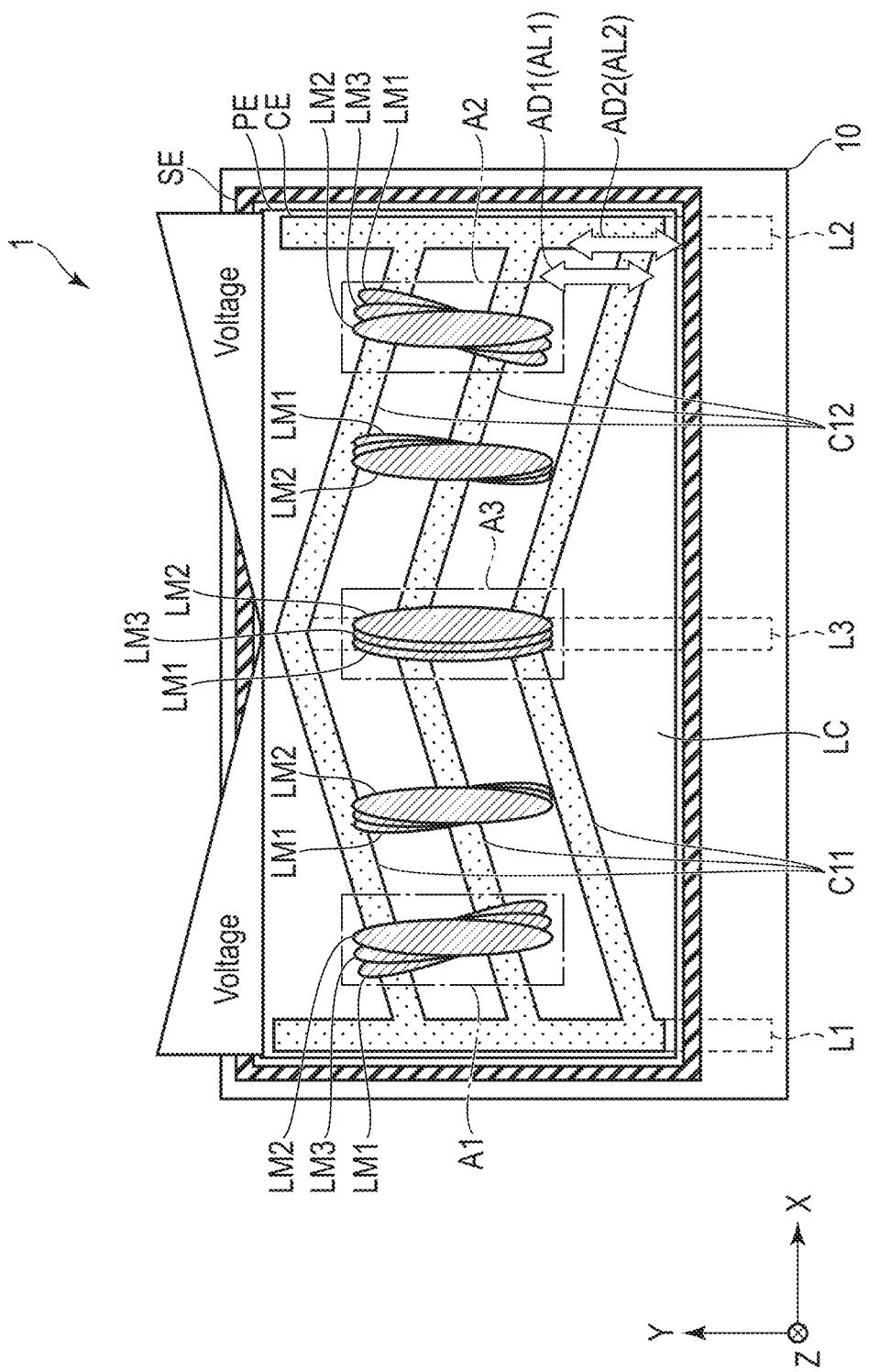
FIG. 27 shows the alignment state of the liquid crystal molecules LM in the on state.

FIG. 27 shows the alignment state of the liquid crystal molecules LM in the on state. The applied voltage of the first wiring L1 and the applied voltage of the second wiring L2 are higher than the applied voltage of a third wiring L3, and the planar electrode PE has a voltage gradient as shown in the figure.

At this time, the potential difference between the planar electrode PE and the control electrode CE in a first area A1 and the potential difference between the planar electrode PE and the control electrode CE in a second area A2 are greater than the potential difference between the planar electrode PE and the control electrode CE in a third area A3. For example, the potential difference in the third area A3 is substantially zero.

Therefore, of the liquid crystal molecules LM1 near the first substrate SUB1, the liquid crystal molecule LM1 in the third area A3 is maintained substantially in the initial alignment state, whereas the liquid crystal molecule LM1 in the first area A1 and the liquid crystal molecule LM1 in the second area A2 are aligned in directions different from the initial alignment direction.

The liquid crystal molecules LM1 are positive liquid crystal molecules, and are aligned along an electric field between the first strip electrodes C11 and the planar electrode PE or an electric field between the second strip electrodes C12 and the planar electrode PE.

Accordingly, if the maximum voltage for driving the liquid crystal molecule LM1 in the first area A1 is applied, the liquid crystal molecule LM1 is aligned such that its major axis is substantially orthogonal to the extension direction EX1 of the first strip electrodes C11 in the X-Y plane. In addition, if the maximum voltage for driving the liquid crystal molecule LM1 in the second area A2 is applied, the liquid crystal molecule LM1 is aligned such that its major axis is substantially orthogonal to the extension direction EX2 of the second strip electrodes C12 in the X-Y plane.

The displacement angle of the liquid crystal molecule LM1 in the first area A1 and the displacement angle of the liquid crystal molecule LM1 in the second area A2 are the greatest, and the displacement angle of the liquid crystal molecule LM1 in the third area A3 is the smallest.

As described above, the planar electrode PE has a voltage gradient such that the voltage decreases gradually from the first wiring L1 to the third wiring L3 and has a voltage gradient such that the voltage increases gradually from the third wiring L3 to the second wiring L2. Therefore, the potential difference between the planar electrode PE and the control electrode CE decreases gradually from the first area A1 to the third area A3 and increases gradually from the third area A3 to the second area A2. Accordingly, the displacement angles of the liquid crystal molecules LM1 decrease gradually from the first area A1 to the third area A3, and increase gradually from the third area A3 to the second area A2.

On the other hand, the liquid crystal molecules LM2 near the second substrate SUB2 are maintained substantially in the initial alignment state in substantially all the area of the active area AA including the first area A1, the second area A2, and the third area A3.

Therefore, in the area from the first area A1 to the third area A3, the respective major axes of the liquid crystal molecules LM arranged in the third direction Z are aligned twistedly counterclockwise from the second substrate SUB2 to the first substrate SUB1.

In addition, in the area from the third area A3 to the second area A2, the respective major axes of the liquid crystal molecules LM arranged in the third direction Z are aligned twistedly clockwise from the second substrate SUB2 to the first substrate SUB1.

The twist angles of the first area A1 and the second area A2 are the greatest and the twist angle of the third area A3 is the smallest. In addition, the twist angles decrease gradually from the first area A1 to the third area A3 and increase gradually from the third area A3 to the second area A2. That is, in the fourth embodiment where the liquid crystal layer LC is composed of a positive liquid crystal material, too, the polarization conversion element 1 having the same optical action as in the above-described second embodiment is provided.

Several control examples of the polarization conversion element 1 will be described next. Note that the applied voltage of each wiring described in the following control examples is an example and the applied voltages are not limited to this.

Figure 28:
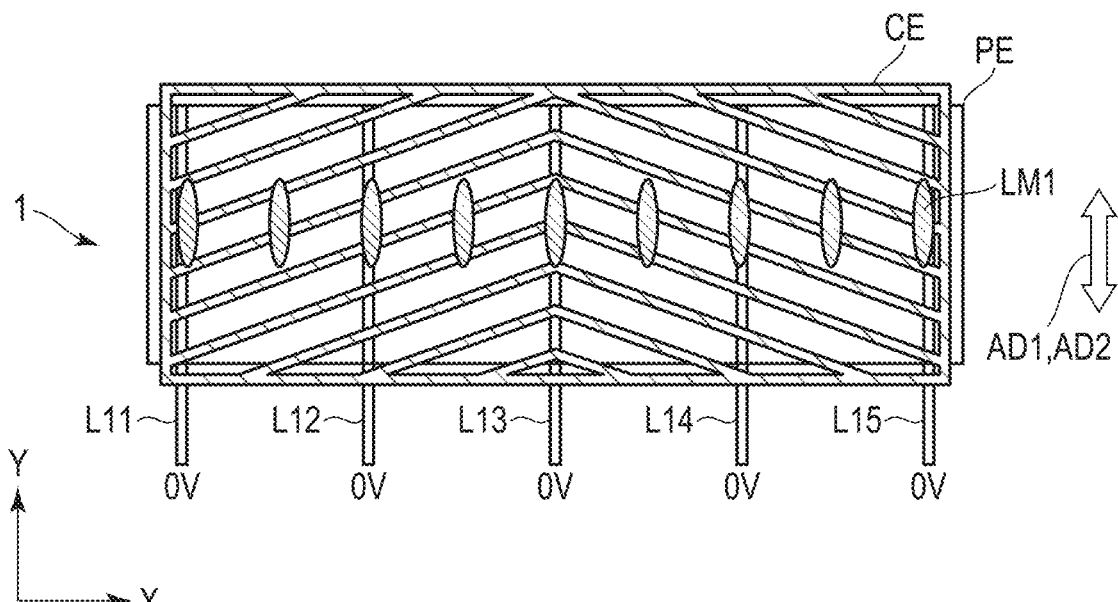
FIG. 28 is a diagram showing the alignment state of the liquid crystal molecules LM1 at the off time.

FIG. 28 is a diagram showing the alignment state of the liquid crystal molecules LM1 at the off time.

The respective applied voltages of wirings L11 to L15 are 0 V. At this time, no potential difference is formed between the control electrode CE and the planar electrode PE, and the liquid crystal molecules LM1 are each initially aligned in the alignment treatment directions AD1 and AD2 (or the second direction Y).

Figure 29:
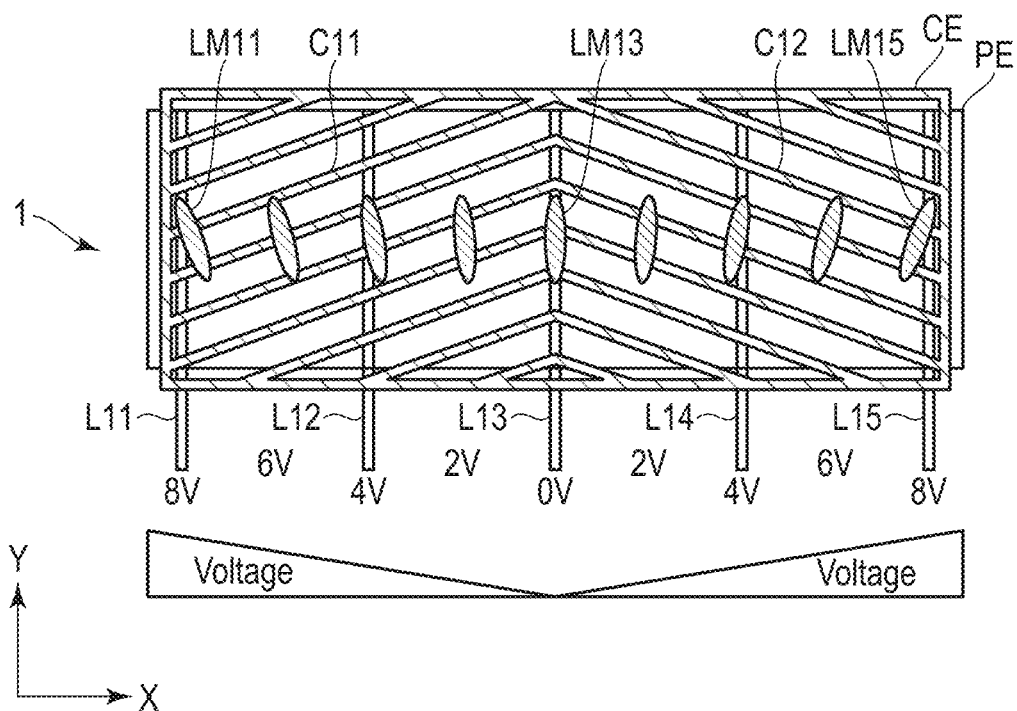
FIG. 29 is a diagram showing the alignment state of the liquid crystal molecules LM1 of Control Example 9.

FIG. 29 is a diagram showing the alignment state of the liquid crystal molecules LM1 of Control Example 9.

The applied voltage of the wiring L11 is 8 V, the applied voltage of the wiring L12 is 4 V, the applied voltage of the wiring L13 is 0 V, the applied voltage of the wiring L14 is 4 V, and the applied voltage of the wiring L15 is 8 V. As a result, a voltage gradient as shown in the figure is formed in the planar electrode PE. Details of the voltage gradient are the same as described with reference to FIG. 17.

The potential difference between the control electrode CE and the planar electrode PE decreases gradually from the wiring L11 to the wiring L13 and increases gradually from the wiring L13 to the wiring L15. If the applied voltage of the control electrode CE is 0 V, the potential difference of the area overlapping the wiring L13 is 0 V.

As a result, of the liquid crystal molecules LM1, a liquid crystal molecule LM11 near the wiring L11 is aligned to be substantially orthogonal to the first strip electrodes C11, a liquid crystal molecule LM13 near the wiring L13 is maintained in the initial alignment state and aligned in the second direction Y, and a liquid crystal molecule LM15 near the wiring L15 is aligned to be substantially orthogonal to the second strip electrodes C12. The liquid crystal molecules LM11 and LM15 are aligned in line symmetry with respect to the liquid crystal molecule LM13.

Figure 30:
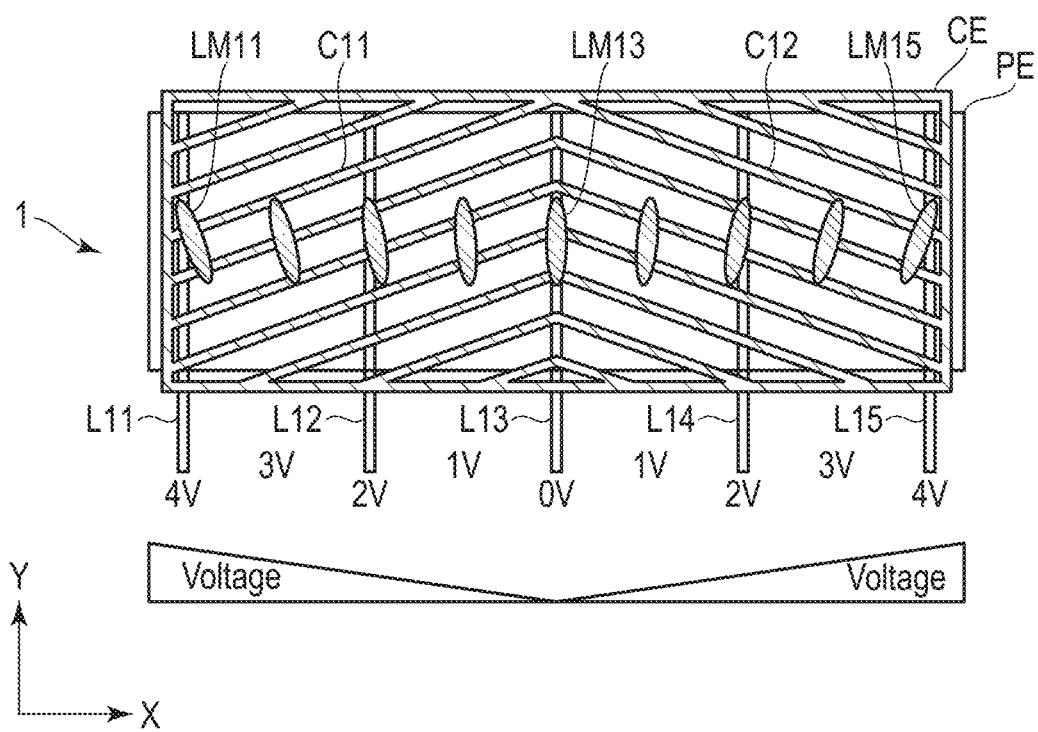
FIG. 30 is a diagram showing the alignment state of the liquid crystal molecules LM1 of Control Example 10.

FIG. 30 is a diagram showing the alignment state of the liquid crystal molecules LM1 of Control Example 10.

The applied voltage of the wiring L11 is 4 V, the applied voltage of the wiring L12 is 2 V, the applied voltage of the wiring L13 is 0 V, the applied voltage of the wiring L14 is 2 V, and the applied voltage of the wiring L15 is 4 V. As a result, a voltage gradient as shown in the figure is formed in the planar electrode PE. Details of the voltage gradient are the same as described with reference to FIG. 18.

The potential difference between the control electrode CE and the planar electrode PE decreases gradually from the wiring L11 to the wiring L13 and increases gradually from the wiring L13 to the wiring L15. If the applied voltage of the control electrode CE is 0 V, the potential difference of the area overlapping the wiring L13 is 0 V.

As a result, of the liquid crystal molecules LM1, the liquid crystal molecule LM11 near the wiring L11 is aligned to cross the first strip electrodes C11, the liquid crystal molecule LM15 near the wiring L15 is aligned to cross the second strip electrodes C12, and the liquid crystal molecule LM13 near the wiring L13 is aligned in the second direction Y. Note that the applied voltage of the wiring L11 and the applied voltage of the wiring L15 are lower than the applied voltages of the example shown in FIG. 29. Thus, the respective displacement angles of the liquid crystal molecule LM11 and the liquid crystal molecule LM15 are smaller than the displacement angles of the example shown in FIG. 29. The liquid crystal molecules LM11 and LM15 are aligned in line symmetry with respect to the liquid crystal molecule LM13.

In the above-described fourth embodiment, too, the same advantages as those explained above can be obtained.

As described above, according to the embodiments, a polarization conversion element which transmits light having a polarization axis in a desired direction in a plane can be provided.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

What is claimed is:

1. A polarization conversion element comprising:
a first substrate comprising a first transparent substrate comprising a first inner surface and a first outer surface, a first wiring and a second wiring disposed on the first inner surface, a transparent planar electrode being in contact with the first wiring and the second wiring, a first insulating film covering the planar electrode, a control electrode disposed on the first insulating film and comprising first strip electrodes extending in a same direction, and a first alignment film covering the control electrode;
a second substrate comprising a second transparent substrate comprising a second inner surface and a second outer surface, and a second alignment film disposed on the second inner surface; and
a liquid crystal layer disposed between the first substrate and the second substrate, wherein
an alignment treatment direction of the first alignment film and an alignment treatment direction of the second alignment film are parallel to each other and cross an extension direction of the first strip electrodes,
the control electrode overlaps the planar electrode in plan view,
an applied voltage of the first wiring is configured to be higher than an applied voltage of the second wiring, and
the planar electrode is configured to have a voltage gradient.

2. The polarization conversion element of claim 1, wherein
the planar electrode is formed of one of IGZO and ZnO, and
the first insulating film is formed of silicon oxide.

3. The polarization conversion element of claim 2, wherein
the first substrate further comprises a second insulating film, and
the second insulating film is disposed on the first inner surface, comprises contact holes penetrating to the first wiring and the second wiring, is in contact with the planar electrode, and is formed of silicon oxide.

4. The polarization conversion element of claim 1, wherein
sheet resistance of the planar electrode is greater than or equal to 100 times wiring resistance of the first wiring and the second wiring.

5. The polarization conversion element of claim 1, wherein
the liquid crystal layer comprises a first area near the first wiring and a second area near the second wiring, and
in plan view in an on state where a potential difference arises between the planar electrode and the control electrode, a twist angle of liquid crystal molecules in the first area is greater than a twist angle of liquid crystal molecules in the second area.

6. The polarization conversion element of claim 5, wherein
the first strip electrodes overlap the first area and the second area in plan view.

7. The polarization conversion element of claim 1, wherein
the control electrode further comprises second strip electrodes extending in a same direction,
the extension direction of the first strip electrodes is different from an extension direction of the second strip electrodes, and
an angle formed by the alignment treatment direction and the first strip electrodes is equal to an angle formed by the alignment treatment direction and the second strip electrodes.

8. The polarization conversion element of claim 7, wherein the liquid crystal layer comprises a first area which is near the first wiring and overlaps the first strip electrodes, a second area which is near the second wiring and overlaps the second strip electrodes, and a third area between the first area and the second area, in plan view in an on state where a potential difference arises between the planar electrode and the control electrode, liquid crystal molecules in the first area is aligned twistedly in an opposite direction to a direction of liquid crystal molecules in the second area, and a twist angle of the liquid crystal molecules in the first area and a twist angle of the liquid crystal molecules in the second area are greater than a twist angle of liquid crystal molecules in the third area.

9. The polarization conversion element of claim 1, further comprising an antistatic layer disposed on the second outer surface, wherein the antistatic layer comprises an input plane of linearly polarized light, and the first outer surface is an output plane of linearly polarized light.

10. The polarization conversion element of claim 9, wherein in an on state where a potential difference arises between the planar electrode and the control electrode, the liquid crystal layer rotates a polarization axis of linearly polarized light incident from the second outer surface.

* * * * *